US006636250B1

(12) United States Patent
Gasser

(10) Patent No.: US 6,636,250 B1
(45) Date of Patent: Oct. 21, 2003

(54) METHODS AND APPARATUS FOR PRESENTING INFORMATION TO A USER OF A COMPUTER SYSTEM

(76) Inventor: Morrie Gasser, 28 S. Mill St., Hopkinton, MA (US) 01748

( * ) Notice: Subject to any disclaimer, the term of this patent is extended or adjusted under 35 U.S.C. 154(b) by 0 days.

(21) Appl. No.: 09/547,510

(22) Filed: Apr. 12, 2000

(51) Int. Cl.[7] .............................................. G06F 17/00
(52) U.S. Cl. ..................................... 345/853; 345/733
(58) Field of Search ................................ 345/717, 733, 345/734, 735, 736, 737, 853, 854, 855, 846, 847, 841, 969

(56) References Cited

U.S. PATENT DOCUMENTS

| 5,333,254 A | * | 7/1994 | Robertson ................... 345/853 |
| 5,664,133 A | | 9/1997 | Malamud et al. |
| 5,812,135 A | * | 9/1998 | Kotchey ...................... 345/853 |
| 6,163,317 A | * | 12/2000 | de Judicibus ............... 345/653 |
| 6,271,846 B1 | * | 8/2001 | Martinez et al. ............ 345/854 |
| 6,308,179 B1 | * | 10/2001 | Petersen et al. .............. 707/10 |
| 6,370,538 B1 | * | 4/2002 | Lamping et al. ............ 707/102 |

OTHER PUBLICATIONS

"Using Shared OS/2 Presentation Manager Controls To Represent Multiple Host File Systems"; IBM Technical Disclosure Bulletin; IBM Corp., New York, New York USA; vol. 37, No. 4A; Apr. 1, 1994; pp. 67–72.
"Graphical Integration Of Heterogeneous Computing Systems"; IBM Technical Disclosure Bulletin; IBM Corp., New York, New York USA; vol. 40, No. 1; 1997; pp. 11–13.
Partial International Search dated Aug. 1, 2002 from International Application No. PCT/US/01/11792, filed Apr. 11, 2001.

* cited by examiner

*Primary Examiner*—Cao (Kevin) Nguyen
(74) *Attorney, Agent, or Firm*—Chapin & Huang, L.L.C.; Barry W. Chapin, Esq.

(57) ABSTRACT

The invention provides a graphical user interface which can use a hierarchical form or style of presentation to depict and display hierarchical and non-hierarchical relationships and objects. In one configuration, the system of the invention displays icons on a graphical user interface on a display of a computer system and receives a user selection of an icon and receives a relationship selection selected by the user that corresponds to the icon selected by the user. The system then performs a relationship function identified by the relationship selection selected by the user. The relationship function is performed upon a descriptor in the memory system that is related, according to the relationship selection, to the icon selected by the user. The relationship function produces a display result that can convey the relationship selection made by the user and that includes an arrangement icon that conveys at least one newly displayed relationship within the graphical user interface and that relates to the icon selected by the user. The system then displays a representation of the display result in the graphical user interface on the display. The system allows a single entity represented by an icon to be displayed in multiple places on the same display of a computer system. Also, certain relationship functions can be used to condense the view of a large number of icons into a shorter sub-list of icons. This provides a more concise view for the user and allows more relationship information to be displayed in a smaller display area.

48 Claims, 13 Drawing Sheets

METHODS AND APPARATUS FOR PRESENTING INFORMATION TO A USER OF A COMPUTER SYSTEM

FIELD OF THE INVENTION

The present invention generally relates to graphical user interfaces, and more particularly, to systems and techniques which present relationships between representations of objects displayed as icons within a graphical user interface.

BACKGROUND OF THE INVENTION

A typical computing system provides a graphical user interface (GUI) which allows users of the computing system to interact with the computing system and its associated software applications, filesystem(s), data, devices and/or peripherals. In many cases, a graphical user interface also provides a representation of remote computer systems and/or devices coupled to computer systems on a network via a graphical view of those remote computer systems and devices. The Windows series of operating systems (e.g., Windows 95, Windows 98, Windows NT, Windows 2000 and Windows CE, collectively referred to herein as Windows), manufactured by Microsoft Corporation of Redmond Wash., provide various application programs that include graphical user interfaces that operate in the manner discussed above. Windows 95, Windows 98, Windows NT, Windows 2000 and Windows CE are trademarks of Microsoft Corporation.

The Windows series of operating systems provide access to a computing system via a graphical representation of that computing system presented to the user on a display. Windows primarily allows a user of the computer system to navigate a file system contained within one or more storage devices (e.g., hard disks) associated with the computing system. A specific software application within Windows that provides such file system navigation capabilities via a graphical user interface is the Windows Explorer application program.

The graphical user interface within the Windows Explorer application can provide a graphical illustration of elements related to the computing system. In most cases, the application uses the graphical user interface to display elements graphically either as directory folder icons, which represent a list or directory of elements, or as icons that represent the specific elements within the folders. For example, if a user uses Explorer to view and graphically navigate a file system, Explorer presents a folder icon to the user via an output device (e.g., a computer display) for each directory or sub-directory on a disk. Explorer represents files within those directories by displaying file icons to the user on the output device that reflect the identity of the software application associated with (e.g., that created) that file. To navigate the file system using Explorer, the user simply clicks or double-clicks folder icons via a user input device such as a mouse that controls a pointer that is drawn upon the graphical user interface. In response to a user clicking a folder icon to "open" that folder, Explorer then redisplays the folder icon to appear as an "open" folder icon. Explorer also re-displays the graphical user interface to include any sub-folders icons or file icons that exist hierarchically below or "within" the open folder. The user may continue to navigate the file system by opening sub-folders in this manner, which causes Explorer to further open or "expand" these sub-folders into other lists of sub-folder and/or file icons.

A user may also close an "expanded" folder icon by clicking on an open folder icon. Closing an open folder in this manner causes Explorer to re-display the graphical user interface so that the graphical user interface no longer contains the sub-folder and file icons that appeared hierarchically below the formerly open folder. In other words, when a user closes an open folder icon, Explorer hides the icons (folders and/or files) that appear hierarchically below the open folder icon.

A user may elect to arrange a list of icons that Explorer displays according to certain pre-defined user selectable views. For example, the user may elect to have an application use a graphical user interface to present icons in a particular view, such as alphabetically, by creation date, by size, by author, and so forth. If a user elects to arrange a view of icons based on one of these attributes, Explorer consults information concerning each file or directory shown as an icon in the graphical user interface and then sorts the list of icons based on the user selected attribute. Then, Explorer displays the sorted list of icons according to the user selected attribute (e.g., size, date, etc.) within the graphical user interface. Explorer displays the sorted list of icons in a separate window for viewing by a user.

SUMMARY OF THE INVENTION

Software applications and computer systems that provide conventional graphical user interfaces are quite limited in their ability to represent multiple relationships between objects which those prior art interfaces represent as icons. For example, prior art graphical user interfaces such as Windows Explorer are limited to displaying icons (representing files and folders) that are arranged in a hierarchical format. This is because designers have developed Windows Explorer and other similar graphical user interface-based applications over many years to take into account the parent—child data relationships that exist between files and folders (directories) in a file system. The Explorer graphical user interface interface, for example, is highly adapted for displaying hierarchical file system data. If a group of data elements is arranged in a non-hierarchical format, a graphical user interface such as Windows Explorer cannot easily represent such data. For instance, if data elements are arranged many-to-many, an application using a hierarchical-based graphical user interface will have difficulty trying to graphically represent such relationships. This limitation causes an application using a prior art graphical user interface to only be able to represent a limited number of relationships within the graphical user interface at one point in time.

For example, a user may be able to view a prior art graphical user interface to determine what elements are hierarchically related above and below a specific element, but the user may have difficulty determining other relationships concerning a specific element by viewing the same part of the graphical user interface at the same time. As an example related to a file stored in a file system on a disk, using only one view of a prior art graphical user interface at one point in time (i.e., without re-navigating and without re-displaying the graphical user interface), a user may not be able to simultaneously determine the following relationships: 1) upon which disk the file is located, 2) upon which volume within the disk the file is stored 3) an operating system type of that file and 3) what other operating systems types exist for other files stored on that same volume or on other volumes or on other disks and 4) what other volumes exist on that same disk or on other disks. As will be explained, the system of the invention provides a graphical user interface for use by an application (or an application that provides a graphical user interface of this invention) that conveys such relationships to a user in a concise format that does not require the user to navigate (e.g., via scrolling) to many different parts of a graphical user interface to determine these types of relationships. In other words, the invention equips an application with a graphical user interface that allows a user to overlay multiple relationships on top of one another so that the user can determine and view the relationships at the same time in the same view of the graphical user interface provided in accordance with this invention.

Another problem with conventional graphical user interfaces is that they do not support the representation of "recursive" hierarchies or multiple instances of the same icon in a single GUI. That is, known graphical user interfaces do not permit an icon that represents a single element (e.g., file or folder) to be represented in the prior art graphical user interface in more than one place at the same time. A prior art graphical user interface cannot display a file icon, for example, in multiple places within the graphical user interface. As used herein, a "recursive" hierarchy can be one, for example, in which both a parent folder and in one or more child folders below the parent folder contain an icon that represents the same object (or descriptor or data structure). As another example, a recursive hierarchy might display two branches of child-icons below a parent icon (e.g., a root icon) and each of the two child-icon branches might contain an icon that represents the same object. Such an example of a recursive hierarchy as provided in this invention might also be consider an ability to display arbitrary relationships that need not be hierarchical in nature. Conventional graphical user interfaces do not generally allow such representations of data and are largely limited to hierarchical displays. The invention however does support and provide such diverse representations which can be used to depict many-to-many relationships, for example.

Prior art graphical user interfaces provide mechanisms such as "shortcuts" that a user may place in various portions of a prior art graphical user interface. These operate simply as a pointer to the file and the user must pro-actively and manually place the shortcut copies into different locations. They are not, in the prior art, created in an automated manner in response to a user seeking to discern a relationship (via selecting a relationship function, as will be explained) between objects by manipulating the GUI. By way of example, a user cannot select a configuration by which to view a prior art graphical user interface that causes a shortcut to be automatically placed in multiple places within the graphical user interface.

Such limitations (e.g., not being able to show "recursive" hierarchies and no automatic creation of icons representing relationships) in the prior art graphical user interface systems helps to ensure consistency in data representation and access and prevents, for example, a user from endlessly navigating a recursive or repeating "path" through a file system. However, these limitations of prior arts systems also significantly limit the relationships that a prior art graphical user interface can represent.

Another problem that is apparent in prior art graphical user interfaces is their inability to concisely represent long lists of icons. For example, if a user opens a folder icon which contains hundreds of files, a prior art graphical user interface will represent each file as a single icon. Such a long list of icons quickly fills a large portion, if not all, of the viewable area in a graphical user interface. Since the size of a computer display upon which an application displays a graphical user interface is limited (e.g., typical computer display sizes range from fifteen to twenty-one inches), a user can become quickly confused as to "where" he or she is "in" a graphical user interface view of a file system. For example, if a user begins to scroll through a long list of hundreds of icons, a prior art graphical user interface is limited in its ability to convey to the user where that icon list "exists" within the hierarchy of the file system once the user has scrolled any hierarchy indication information off of the viewable area of the graphical user interface. Thus, when a user first expands an icon to produce a long icon list, the user may have an indication as to where this list of icons resides in relation to the hierarchy of the file system. However, once the user begins to scroll the icon list looking for a particular icon of interest in the list, the graphical user interface quickly scrolls the folder icon that was opened or expanded to produce the icon list off the display. After a few moments, the user may be unable to determine where the icons that the user is viewing (i.e., the long list) exist within the hierarchy, and the user must rely on his or her memory to recall the hierarchical position of these icons (files or folders) in the file system. A window may provide a scroll bar that offers some indication of where the user may be in a list of icons, but the position of the scroll bar often depends upon what other items in the list have been expanded.

The present invention provides a unique graphical user interface that significantly overcomes many of the problems of prior art graphical user interfaces. While the invention is directed to the graphical user interface and the routines, procedures, functions and processes that provide such an interface, software applications that include a graphical user interface routines that operate in accordance with this invention to provide a graphical user interface as explained herein are also considered embodiments of this invention. In brief, the invention provides a graphical user interface that allows recursive hierarchies, and allows a user to select multiple relationships to be viewed on the graphical user interface at the same time. The relationships are user selectable and user definable so that the user can tailor the interface of this invention to his or her liking. This avoids having to abide with prior art graphical user interface limitations such as only representing hierarchical data and not being able to represent recursive data. By way of example, using this invention, a particular element in a graphical user interface can be present via the same icon in more than one position on the graphical user interface at the same time.

The system of the invention is typically provided in a computer system having a memory system and a display that displays a graphical user interface. Using such a computer system, the present invention provides a method for presenting relationships between objects to a user of the computer system. In one configuration, the method comprises the steps of displaying a plurality of icons on the graphical user interface and receiving a user selection of an icon from the plurality of icons. The user may selects icons, for example, via a pointing device such as a mouse, keyboard, joystick, voice commands or any other type of user input device. The method of this embodiment receives a relationship selection selected by the user that corresponds to the icon selected by the user and performs a relationship function identified by the relationship selection selected by the user. As will be explained further, the graphical user interface of this invention presents relationship selections to the user that can vary depending upon the state of the graphical user interface. The relationship function is performed upon a descriptor (one or more) in the memory system that is related, according to the relationship selection, to the icon selected by the user. The relationship function produces a display result that includes an arrangement icon that represents a newly displayed relationship to the icon selected by the user. The arrangement icon included in the display result thus provides a graphical view of a newly visible (i.e., on the graphical user interface) relationship that is related to one or more icons that are related to the icon originally selected by the user. The method also includes the step of displaying a representation of the display result in the graphical user interface on the display.

In some embodiments, user selectable relationships can be dynamically determined at runtime and the relationship function specified by the selected relationship can produce a display result that is rendered into a graphical user interface that allows such things as recursive hierarchies. The system also allows multiple relationships to be displayed in one section of the graphical user interface at one time, thus saving graphical user interface space and allowing a user to gain additional information from viewing the multiple relationships at one point in time.

In another configuration, the interface provided by this invention displays a hierarchical configuration of object icons and arrangement icons on the graphical user interface. Each object icon represents a respective object descriptor within the memory system and each arrangement icon represents a respective arrangement descriptor within the memory system and each arrangement descriptor also represents at least one relationship between certain of the object descriptors within the memory system. The arrangement descriptor can thus serve various purposes in the interface such as providing groupings to which objects presented within the interface can be members.

In one configuration, each object descriptor and each arrangement descriptor are maintained in a descriptor tree, and arrangement descriptors defined in a first level of the tree serve as group arrangement descriptors. To this end, the system of the invention maintains descriptors in memory that represent icons. Actual objects that the graphical user interface of the invention is to graphically convey to users are represented in memory via object descriptors which are then graphically rendered as object icons. For example, in the context of a software application that includes a graphical user interface of this invention that is used to manage a storage system, objects might include such things as storage systems, disks, volumes, files, and directors used to control volumes within a storage system. The system of the invention uses arrangement descriptors however to store relationship information concerning relationships between objects (represented in memory by their respective object descriptors). An example arrangement descriptor that might perhaps exist in the context of a storage management software application is an arrangement descriptor that represents a particular operating system type. Such an arrangement descriptor may be considered a group for its operating system type. Members of the group might be various object descriptors that represent volumes, for example, that contain (e.g., store) data or files generated by the operating system type associated with the group arrangement descriptor. Those object descriptors are said herein to be a "member" of that group.

Returning now to the summary of the method embodiments of this invention, in another configuration, the step of receiving a relationship selection selected by the user includes the steps of dynamically determining a set of relationships that are applicable to the icon selected by the user and displaying the set of relationships on the graphical user interface in a relationship selection menu. The method also includes the step of allowing the user to select the relationship selection from the set of relationships displayed on the graphical user interface. Since relationships can be dynamically determined, changing configurations of data can be reflected by changing relationships that are presented to the user for selection.

In yet another configuration, the step of dynamically determining a set of relationships that are applicable to the icon selected by the user includes the steps of determining an identity of a descriptor in the memory system that corresponds to the icon selected by the user. The method also includes the step of determining a list of selected icon child descriptors related to the descriptor in the memory system that corresponds to the icon selected by the user. This step essentially identifies the children of the selected icon (though they may not yet be displayed on the graphical user interface). Then, for each selected icon child descriptor in the list of selected icon child descriptors, the method determines a list of group arrangement descriptors in the memory system that include a relation to that selected icon child descriptor. Thus, if a selected icon references a group via a child pointer or reference, that group is added to the list of group arrangement descriptors. The method then creates a relationship selection in the set of relationships for each unique group arrangement descriptor existing in the list of group arrangement descriptors for each selected icon child descriptor. In this manner, the user is able to select relationships for an element based upon the groups to which that a particular element (represented via its icon) is a member.

In another configuration, the step of performing a relationship function includes the steps of determining a group arrangement descriptor in the memory system that corresponds to the relationship selection selected by the user. There may be one or more than one group arrangement descriptor that corresponds in this manner. The method also determines a list of group child descriptors related to the group arrangement descriptor in the memory system that corresponds to the relationship selection selected by the user. Thus, the children descriptors of a selected icon are determined. With this information, the method continues by creating a sub-list of child descriptors that depends hierarchically from the descriptor in the memory system that corresponds to the icon selected by the user. The sub-list of child descriptors includes a reference to each group child descriptor in the list of group child descriptors. The method also includes the step of producing a display result that includes icons corresponding to each child descriptor in the sub-list of child descriptors. In this manner, a user selects a relationship that corresponds to a group to which the user selected icon is a member. Then, a display result is produced that includes child descriptors (i.e., children icons) from the group corresponding to the user relationship selection that reference (i.e., a related to) children icons of the user selected icon. In this manner, a user can select an icon and can decide with which groups to organize this icon. Since multiple groups may each contain a reference to a single icon, the graphical user interface of this invention allows an icon to appear in multiple places.

In another configuration, the step of creating a sub-list of child descriptors includes the step of, for each selected icon child descriptor in the list of selected icon child descriptors, determining which group child descriptor in the list of group child descriptor contains a relation to that icon child descriptor and adding that group child descriptor to the sub-list of child descriptors.

In another configuration, the step of determining a list of group arrangement descriptors in the memory system that include a relation to that selected icon child descriptor determines a list of group arrangement descriptors in the memory system that include a relation to that selected icon child descriptor other than an arrangement descriptor corresponding to the icon selected by the user. This way, if a user initially selects an arrangement icon upon which to apply a relationship, the user will not be presented with a sub-list of icons that include a reference to the arrangement icon selected by the user.

As opposed to embodiments of the invention that provide dynamic determination of relationships, the system of the invention includes embodiments that can also present static relationships to a user. According to such a configuration, the step of receiving a relationship selection selected by the user includes the steps of determining an identity of a descriptor in the memory system that corresponds to the icon selected by the user and determining a set of relationships identified within the descriptor that corresponds to the icon selected by the user. The set of relationships may be hard-coded, for example, into the descriptor corresponding to the user selected icon. The method also displays the set of relationships on the graphical user interface and allows the user to select the relationship selection from the set of relationships displayed on the graphical user interface.

In another configuration, the step of determining a set of relationships identified within the descriptor that corresponds to the icon selected by the user includes the steps of identifying object properties of the descriptor in the memory system that corresponds to the icon selected by the user. Such properties may indicate many things about an object, for instance, under control of an application that provides the graphical user interface of this invention. The method also creates a relationship selection in the set of relationships for each unique object property identified in the descriptor in the memory system that corresponds to icon selected by the user.

According to another configuration, the step of performing a relationship function includes the steps of determining a list of selected icon child descriptors related to a descriptor in the memory system that corresponds to the icon selected by the user. This essentially determines the children of the selected icon. Then the method sorts the list of selected icon child descriptors based on at least one property of each selected icon child descriptor. The property corresponds to the relationship selection selected by the user. Based on the step of sorting, the method produces a sub-list of child descriptors that depend hierarchically from the descriptor in the memory system that corresponds to at least one icon selected by the user. The sub-list of child descriptors includes at least one arrangement descriptor corresponding to the property corresponding to the relationship selection selected by the user. The method also produces a display result that includes icons for each child descriptor in the sub-list of child descriptors. In this manner, properties of icons (descriptors which the icons represent) can be used as a basis for relationships that can be simultaneously viewed.

According to yet another configuration, the relationship selected by the user indicates that the user desires to sort by name a list of selected icon child descriptors that relate to a descriptor in the memory system that corresponds to the icon selected by the user. In this technique, the step of sorting condenses the list of selected icon child descriptors into the sub-list of child descriptors based on a name of each selected icon child descriptor and based on a total number of selected icon child descriptors. The sub-list of child descriptors has less descriptors than the list of selected icon child descriptors. Thus the resulting displayed list is shorter that the original displayed list. The sub-list of child descriptors includes at least one child descriptor that is an arrangement descriptor that represents more than one selected icon child descriptor and that may be expanded to produce a display result that shows each selected icon child descriptor which that arrangement descriptor represents. In this manner, the system of the invention provides a condensed version of a list of icons.

In another arrangement of the invention, the techniques outlined above can including the steps of receiving a user selection of an icon to expand within the plurality of icons displayed on the graphical user interface and determining an identity of a descriptor in the memory system that corresponds to the icon selected to expand. Next, the method determines a sub-list of selected icon child descriptors related to the descriptor in the memory system that corresponds to the icon selected by the user and produces a display result that includes icons for each selected icon child descriptor in the sub-list of selected icon child descriptors. This allows a user to expand an icon to see other relationships on the graphical user interface.

In another configuration, the relationship selection selected by the user specifies a grouping by which to arrange the icons related to the icon selected by the user and the relationship function produces a display result containing icons arranged according to the specified grouping.

In yet another configuration, the display result includes a sub-list of at least one icon, and the sub-list of the icon include an icon for each value of the specified grouping to which a child descriptor of a descriptor related to the icon selected by the user belongs.

In another configuration, the graphical user interface is provided by a storage system management application and certain icons displayed on the graphical user interface represent entities related to a storage system and certain other icons identify relationships between certain entities related to a storage system.

In yet another configuration, certain icons within the graphical user interface identify relationships between operating system types and locations of entities related to a storage system.

The invention also provide a configuration in which the relationship selection selected by the user indicates that the user desires to sort by name a list of selected icon child descriptors that relate to a descriptor in the memory system that corresponds to the icon selected by the user. In this instance, the step of performing the relationship function condenses the list of selected icon child descriptors into a sub-list of child descriptors based on a name of each selected icon child descriptor and based on a total number of selected icon child descriptors. The sub-list of child descriptors has less descriptors than the list of selected icon child descriptors. The relationship function in this case produces a display result that includes icons corresponding to descriptors in the sub-list of child descriptors. The sub-list includes at least one child descriptor that is an arrangement descriptor that represents more than one selected icon child descriptor and that may be expanded to produce a display result that shows each selected icon child descriptor which that arrangement descriptor represents. This allows more condensed viewing of the graphical user interface of this invention.

In another configuration, the relationship selection selected by the user specifies a condense relationship function to display a condensed view of a sub-list of icons that depend from the icon selected by the user and the step of performing a relationship function performs the steps of determining that a number of icons to be displayed below the icon selected by the user exceeds a predetermined number and condensing the number of icons to be displayed into a list of series arrangement icons and providing the condensed list of series arrangement icons in the display result.

In another configuration, the step of condensing includes the steps of computing the square root of a total number of icons to be displayed and providing, in the display result, a number of series arrangement icons equal in number to the square root of the total number of icons to be displayed. The configuration also determines if the square root multiplied by the square root is less than the total number of icons to be displayed, and if so, provides one extra series arrangement icon to be displayed in the display result.

According to another embodiment of the invention, a method for simultaneously displaying multiple relationships between entities managed by a software application is provided. The method comprises the steps of maintaining, in a memory system, a plurality of object descriptors each representing an entity managed by the software application and displaying, on a graphical user interface, at least two arrangement icons that include a relationship to a common object descriptor. This method also includes the step of displaying, on the graphical user interface, an object icon representing the common object descriptor, the object icon displayed in relation to the at least two arrangement icons that include the relationship to the common object descriptor in order to convey to a user of the graphical user interface that the at least two relationships represented by the arrangement icons relate to the object icon.

In another configuration, the step of displaying, on a graphical user interface, the at least two arrangement icons displays the at least two arrangement icons hierarchically under the object icon representing the common object descriptor. In this configuration, the method further includes the steps of receiving a relationship selection selected by the user that corresponds to one of the at least two arrangement icons and in response to the step of receiving a user selection of a relationship, expanding the one of the at least two arrangement icons to produce a sub-list of icons that are related to the common object icon based upon the relationship selected by the user.

In another configuration, the method includes the step of displaying, in a common hierarchy of the graphical user interface, an icon representing a descriptor twice, such that the common hierarchy is a recursive hierarchy.

According to another embodiment, in a computer system having a memory system and a display that displays a graphical user interface, a method is provided according to this invention for presenting relationships between icons to a user of the computer system. This method embodiment comprises the steps of displaying a plurality of icons in the graphical user interface on the display and receiving a user selection of an icon from the plurality of icons. Then, the system of the invention receives a relationship selection selected by the user that corresponds to the icon selected by the user. The system then performs a relationship function identified by the relationship selection selected by the user. The relationship function is performed by the system upon a descriptor in the memory system that corresponds to the icon selected by the user. The relationship function produces a display result that includes a modified appearance of an icon that is different than the icon selected by the user but that corresponds to the descriptor in the memory system that corresponds to the icon selected by the user. The system then displays a representation of the display result in the graphical user interface on the display.

In this manner, a user can select an icon and chose to manipulate this selected icon in some manner according to a selected relationship. The relationship function performed on this icon causes at least one other icon on the graphical user interface to be modified as per the relationship function as well. In this embodiment, the other icon that gets modified represents the same descriptor (e.g., the same object) as the icon selected by the user. Or in other words, an object displayed as an icon in multiple places (as allowed in this invention) that a user selects can be modified, and this modification is automatically conveyed in other places where this icon is displayed, without the user having to manually modify each instance of the icon.

According to another aspect of this embodiment, the relationship function identified by the relationship selection selected by the user corresponds to at least one of a move, add, copy, modify and delete relationship function that is performed on the icon selected by the user. The modified appearance produced in the display result indicates the result of the relationship function upon the icon that is different than the icon selected by the user but that corresponds to the descriptor in the memory system that corresponds to the icon selected by the user. Thus, if a user for instance deletes an icon from a sub-list of icons, the relationship created as a result of this action can be conveyed, for instance, by removing the same icon located elsewhere on the display (perhaps in a group to which that icon's corresponding object is/was related, before being deleted). Thus, if a user moves, adds, copies, modifies or otherwise manipulates the relationships associated with an object via that objects icon, other instances of that objects icon on the display, if affected by such a relationship change, will be automatically updated by the system of the invention.

Other embodiments of the invention include a computer system comprising a display, a memory system, a processor, and a bus connecting the display, the processor and the memory system. In this configuration, the memory system is encoded with an application that when performed on the processor, causes the processor to provide a graphical user interface on the display of the computer system. The graphical user interface displays a plurality of icons on the graphical user interface to a user of the computer system, and receives, via a user input device coupled to the bus, a user selection of an icon from the plurality of icons and further receives, via the user input device, a relationship selection selected by the user that corresponds to the icon selected by the user. When the application is further performed on the processor, the application causes the processor to perform a relationship function identified by the relationship selection selected by the user. The relationship function operates upon a descriptor in the memory system that is related, according to the relationship selection, to the icon selected by the user. The relationship function produces a display result that conveys the relationship selection and that includes an arrangement icon that relates to the icon selected by the user and the processor displays a representation of the display result in the graphical user interface on the display.

Other embodiments include a computer system configured to perform all of the aforementioned methods via software control, or via hardware configured to perform those methods and the techniques disclosed herein as the invention.

Other arrangements of the invention that are disclosed herein include software programs to perform the operations summarized above and disclosed in detail below. More particularly, a computer program product is disclosed which has a computer-readable medium including computer program logic encoded thereon to provide the graphical user interface of this invention and its associated operations. The computer program logic, when executed on at least one processor with a computing system, causes the processor to perform the operations indicated herein. This arrangement of the invention is typically provided as software on a computer readable medium such as an optical, floppy or hard disk or other such medium such as firmware in one or more ROM or RAM chips. The software can be installed onto a computer system to cause the computer system to perform the techniques explained herein as the invention.

It is to be understood that the system of the invention can be embodied strictly as a software program, as software and hardware, or as hardware alone.

An example implementation of the invention that incorporates many of the aforementioned embodiments and those explained further below is the graphical user interface which is incorporated and provided as part of the EMC Enterprise Control Center (ECC), Java Edition, software. ECC is a software program that is manufactured by EMC Corporation of Hopkinton, Mass. Typically, a systems or network manager uses ECC, via a graphical user interface that is similar to the embodiments explained herein, to manage storage systems and other devices in a networked computing system environment.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention relates to unique mechanisms and techniques for displaying representations (e.g., icons) of data objects and for manipulating and viewing relationships between those representations of data objects using a unique graphical user interface provided on a display coupled to a computerized device. The graphical user interfaces and graphical user interface operations provided by embodiments of this invention advanced the state of the art in many ways by allowing the user to conveniently view and manipulate representations of data objects that are hierarchical, as well as those that are not strictly hierarchical. The invention also allows a user of the graphical user interface to define how he or she desires to view relationships between objects that are not hierarchically related in a display format that mimics a hierarchy. The user can thus create relationship views of objects that are overlaid with one another within the hierarchical view.

Example Embodiments of the Invention

This system of the invention is best explained by first presenting an example of a networked computing system and storage environment (FIG. 1) that is suitable for use in explaining example operations of the invention. The description of this example is then followed by a number of screenshots (FIGS. 2 through 7) of an example management application that incorporates embodiments of the graphical user interface of this invention to allow a user to navigate and manage objects (computing systems, associated devices, data, files, storage systems, network segments, and so forth) within the context of the example computing and storage system environment provided in FIG. 1.

Figure 1:
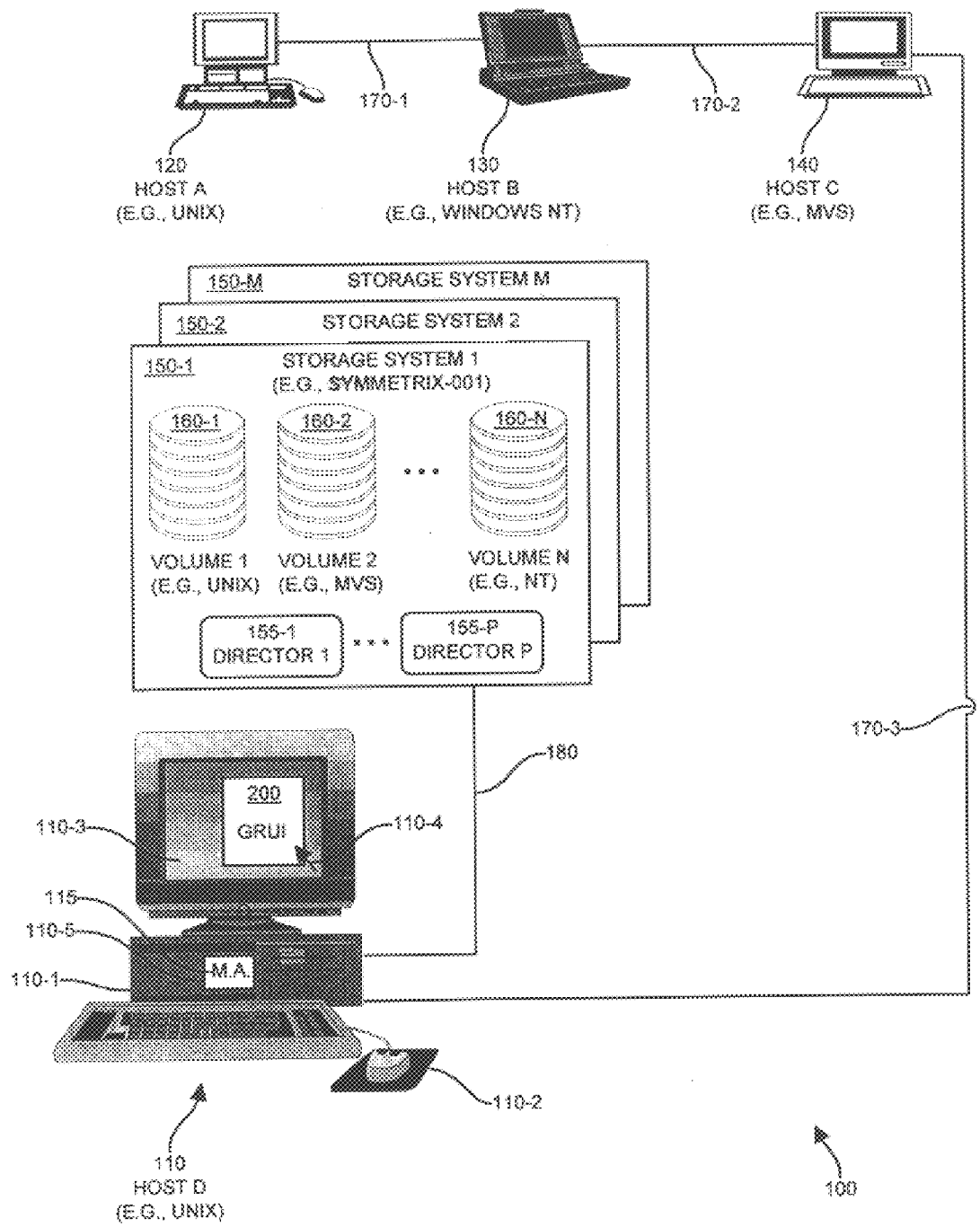
FIG. 1 illustrates an example networked computing system and storage system environment that is suitable for use in describing example operations of a graphical user interface configured according to the invention.

FIG. 1 illustrates a networked computing system and storage environment 100 that is suitable for use in providing detailed example descriptions of operations of the invention. The networked environment 100 includes network connections 170-1 through 170-3 which interconnect with a number of host computing systems 110, 120, 130 and 140. Connection 180 couples a number of shared storage systems 150-1 through 150-M to the computing system 110. Each storage system 150 includes a number directors 155-1 through 155-P and a number of storage volumes 160-1 through 160-N. The host computing system 110 operates as a server for the data maintained within volumes 160 on the storage systems 150. The shared storage systems 150 may be, by way of example only, Symmetrix disk storage systems manufactured by EMC Corporation of Hopkinton, Mass. The computing systems 110 through 140 can access the various volumes 160-1 through 160-N within each storage system 150 over the network connections 170 to store and retrieve data.

The host computing system 110, which is shown in a bit more detail than hosts 120, 130 and 140, includes a central processing unit 110-1, a user input device 110-2 which is a hand-operated mouse or other pointing device in this example, an memory system 110-5 (shown in this figure, but typically contained within the computing system 110 itself), and a display 110-3 (e.g., a computer monitor) that displays an output of a graphical user interface called a Graphical Relationship User Interface or GRUI 200 that is configured according to the invention. A management application 115 (i.e., a software program) resides in the memory 110-5 within the computing system 110 and provides the GRUI 200 as an operational interface to the management application 115. A user (i.e., a network or systems manager or administrator, not shown) can interface with the GRUI 200 on the computing system 110 to control the management application 115 to manage the various objects (storage systems 150, and possibly computing systems 110 through 140) shown in FIG. 1. More specifically, the user can manipulate the input device 110-2 to maneuver and control a pointer 110-4 on the display 110-3 to operate the GRUI 200 according to mechanisms and techniques provided by the invention as disclosed herein.

It is of particular interest to this example discussion that the computer systems 110, 120, 130 and 140 operate using a variety of different operating systems and/or computing architectures. In this example, the different operating systems include Unix (computing systems 110 and 120), Windows NT (computing system 130) and MVS (computer system 140). Since each computing system 110 through 140 operates using a different operating system, a systems manager/user can, for example, use the management application 115 on the computing system 110, via the GRUI 200, to configure specific file systems (not specifically shown) on each volume 160 in each storage system 150 for use by the different operating system types. By way of example, volume 160-1 in storage system 150-1 might contain a Unix file system for use (i.e., access) by computing systems 110 and/or 120 (Unix-based computers), while the computing system 130 (Windows NT-based) may require and use a Windows NT file system that the systems manager might create on volume 160-2. A systems manager may configure other volumes 160 within the various storage systems 150 in a similar manner for access by MVS-based computing system 140, or other operating systems as needed. A systems manager may also use the GRUI 200 to view and manipulate the configuration of the directors 155 in a similar manner.

For this example discussion, it is also of interest to note the layout of the network connections 170-1 through 170-3 in the environment 100. In this example, computing system 120 directly connects only with computing system 130, while computing system 130 only directly connects to computing systems 120 and 140, while computing system 140 only directly connects to computing systems 130 and 110.

As will be explained in more detail, the relationships between the operating system types, volume and director configurations, and the interconnections between the computing systems are not strictly hierarchical. For example, the network connections 170 between the computing systems 110 through 140 form a group of peer-to-peer networking relationships rather than a hierarchical relationship. In many other networking configurations, interconnections between computing systems are many-to-many which do not easily translate into hierarchical relationships. As another example, a particular operating system type (e.g., Unix) in a particular computing system (e.g., 130) may require access (e.g., read/write) to a set of volumes 160 which may be contained within many different storage systems 150. These volume/computing system/operating system type relationships do not lend themselves to representation in a hierarchical manner. This invention provides a graphical user interface (GRUI 200 in the figures) that allows a user to view, navigate and manipulate both hierarchical and non-hierarchical relationships between any types of objects in an easy and concise manner.

It is to be understood that while the example descriptions of the "look-and-feel" and operation of the graphical user interface of this invention are provided in the context of an example related to the management of storage systems, the graphical user interface and associated operations of the system of the invention are not limited to this type of application. Rather, the graphical user interface (e.g., GRUI 200) and its associated operations of this invention are applicable to (e.g., can be integrated into) most any type of software application that requires a graphical user interface to represent various items, objects, components, relationships and/or the like. As such, the principles and operations explained herein as the invention are meant to be general in nature and applicable to all types of graphical user interfaces that operate in the manner explained here.

Now that the example computing system and storage environment 100 has been explained to the extent necessary for this invention, examples of the invention in operation will be explained with respect to FIGS. 2 through 8 in the context of the example environment 100 explained with respect to FIG. 1. Generally, while the invention provides a graphical user interface (i.e., provides code or other mechanisms that present on a computer display the interface as shown, for example, in FIGS. 2 through 8), the term "graphical relationship user interface" or GRUI is used herein in the context of the following examples to indicate that the invention provides an interface that can convey multiple relationships to a user.

Figure 2:
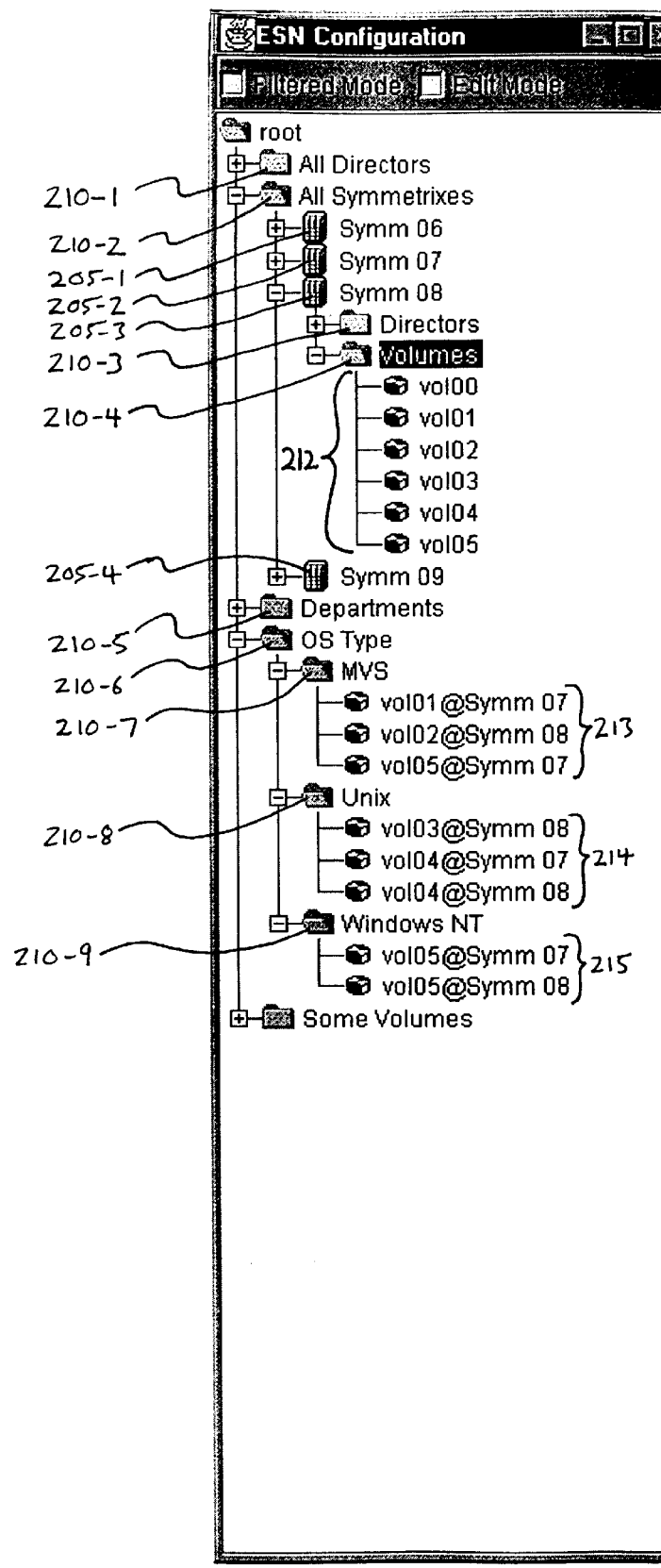
FIG. 2 illustrates a display of a graphical user interface that is configured according to an example embodiment of the invention.

FIG. 2 shows an example screenshot from a management application 115 that provides a graphical relationship user interface 200 (hereinafter called GRUI 200) that is configured according to this invention. In this particular example, the management application 115 that performs (e.g. executes, gets interpreted, or otherwise operates) on the host computing system 110 in FIG. 1 provides the GRUI 200 as a graphical user interface to allow a user such as a systems manager to manage the various storage systems 150 shown in FIG. 1. The GRUI 200 includes a number of graphically displayed icons 205 and 210 that correspond to various components and relationships between components within the storage systems 150, as will be further explained.

Briefly, many aspects of the arrangement or "look-and-feel" of the GRUI 200 in FIG. 2 appear and operate much like graphical user interfaces provided by other software applications. For example, a "+" symbol that appears to the left of any icon 205, 210 in the GRUI 200 indicates that this icon is in a collapsed state. An example of a collapsed icon is icon 205. A user may "click" (or double click) a collapsed icon which will cause the GRUI 200 to "expand" the collapsed icon into an "expanded" or "open" icon. A "−" symbol next to an icon indicates that the icon is in an expanded state. An example of an expanded icon is icon 205-2, which in this example appears as an open folder to graphically illustrate that this icon is in an expanded or opened state. A user clicks or double clicks an icon by maneuvering the pointer 110-4 (FIG. 1) via the user input device 110-2 (e.g., a mouse or other pointing device) on the display 110-3 over the icon and by depressing (i.e., clicking) one or more buttons (not specifically shown) on the user input device 110-2.

When an collapsed icon is expanded, the software application that controls the GRUI 200 (in this example, the management application 115) also displays a sub-list of zero or more other icons (e.g., icon sub-list 212, for example) underneath and indented to the right of the expanded icon (e.g., icon 205-2). A sub-list of icons conveys to the user of the GRUI 200 that all icons in the sub-list are related in some manner to the icon that was expanded to produce the sub-list of icons, which in the example is icon 205-2 for sub-list 212. In other words, in this example GRUI 200, icon 205-2 is in an expanded state to show the sub-list of icons 212 that relate or depend from icon 205-2. The icons in a sub-list are also sometimes referred to as "children" of the icon from which they relate, while the icon from which a sub-list depends is called the "parent" of each icon in a sub-list.

More specifically related to this invention, the example GRUI 200 in FIG. 2 provides a user with the ability to graphically navigate through the configurations of the storage systems 150-1 through 150-M in FIG. 1. By viewing the GRUI 200, a user can intuitively gain significant amounts of information concerning the relationships between various Symmetrix storage systems 150, as well as their associated directors 155, volumes 160 and operating system types.

In this example, the management application 115 maintains each icon 205, 210 as a graphical representation of a data structure in the memory 110-5. It is to be understood that for the purposes of this invention, an icon may include a text label, a graphic image, or a combination of a text label and graphic image as in this example. That is, though most of the example icons 205, 210 in this embodiment include text labels (one or more words or phrases adjacent to a graphical image) as well as a graphical images (e.g., open and closed folders), an icon for the purposes of this invention may be limited to a portion of text (called a label) or a graphic alone that represents an entity (e.g., an descriptor in memory) within a computing system as explained herein. As such, the traditional meaning of the word "icon" as being a graphic is expanded herein to include any of the above types of graphic and/or text information that may be displayed, printed or otherwise rendered upon some medium (e.g., computer monitor, printer, etc) by a computing system.

The various icons 205, 210 in FIG. 2 represent either one of two main types of data structures (not shown in this figure): object descriptor data structures (represented by object icons 205) and arrangement descriptor data structures (represented by arrangement icons 210). These descriptor data structures will be explained in more detail later. For now, it is sufficient to state that the management application 115 maintains object descriptors in memory 110-5 to store information about an actual devices, components, or other entities (e.g., volumes, directors, and storage system) under management or control of the management application 115, while arrangement descriptors are maintained to store information about relationships (e.g., groupings) that exist between the objects described in the object descriptors.

Within the GRUI 200, an object icon 205 represents one or more object descriptors in memory 110-5 (typically only one), while an arrangement icon 210 represents one or more arrangement descriptors in memory 110-5 (typically only one). By way of example, each object icon in the sub-list 212 corresponds to a respective object descriptor (not shown in this figure) in memory 110-5 that contains information concerning a particular volume corresponding to that icon (i.e., volumes "vol00" through "vol05"). As another example, arrangement icon 210-4 represents an arrangement descriptor (not shown in this figure) in memory 110-5 that defines the relationship(s) between the volumes in the sub-list 212 (i.e., the volumes represented by the volume object icons "vol00" through "vol05") to the storage device object icon 205-3 from which the arrangement icon 210-4-2 extends or depends. An arrangement icon 210 can be considered to represent one or more relationships (defined in a corresponding arrangement descriptor in memory 110-5) for any object icons 205 that can be displayed beneath and indented to the right with respect to that arrangement icon 210. In most cases, the reader may consider arrangement icons 210 to represents groups, to which other icons (either other object icons or other arrangement icons) may be considered members.

Users can expand and collapse object icons 205 and arrangement icons 210 to view relationships between the various objects, devices, components or the like that are under management by the management application 115. For example, the "All Symmetrixes" arrangement icon 210-2 is expanded in this example so that the GRUI 200 displays relationships between storage systems represented by object icons 205-1 through 205-4. As another example, the storage system object icon 205-3 ("Symm 08") has been further expanded in this example to show "Director" and "Volumes" arrangement icons 210-3 and 210-4, respectively, which have a relation to the object descriptor in memory 110-5 corresponding to the storage system object icon 205-3.

As will be explain ed in more detail, the system of this invention allows a user to select (e.g., via a mouse click-and-hold operation) an arrangement icon (one of icons 210 in FIG. 2, to be explained in more detail) and to further select a relationship function (e.g., via a pull-down menu, not shown in FIG. 2) related to the selected arrangement icon 210. In response, the invention (embodied within the management application 115 in this example) performs the selected relationship function as defined in (or referenced by) the arrangement descriptor (in memory 110-5, FIG. 1) that corresponds to the selected arrangement icon 210 in order to produce a display result on the GRUI 200 that shows the outcome of the relationship function. The display result includes at least one other arrangement icon.

According to the GRUI 200 of this invention, depending upon how a user manipulates his or her selection (e.g., expansion) of icons 205, 210, the same icon (one of 205 or 210) might appear in multiple places within the GRUI 200 hierarchy. Conventional GUIs avoid duplicate icons that represent the same object in order to avoid confusing a user viewing the display. As will be further understood however, multiple representations of the same object in the GRUI 200 of this invention can convey powerful relationships that might exist between various objects. Such relationships are difficult if not impossible to discover in prior art interfaces due, in part, to their inability to display duplicate object icons. Examples of these and other features and operations of the invention will be explained with respect to FIGS. 3 through 8.

Thus far, the description of the GRUI 200 in FIG. 2 has been provided for relationships that are mostly hierarchical in nature. For example, the system of the invention can display a list of storage systems object icons, and a user can expand these to show the directors and volumes contained therein. A user can then further expand, for example, a volume arrangement icon to cause the system of the invention to display sub-list of other icons, as so forth.

As previously noted however, the invention is particularly well suited for displaying information concerning non-hierarchical relationships. This is illustrated in the lower half of the GRUI 200 in FIG. 2 via the expansion of the "OS Type" arrangement icon 210-6 into a sub-list of other operating system specific arrangement icons 210-7 through 210-9 (i.e., the MVS, Unix and Windows NT arrangement icons). Each arrangement icon 210-7 through 210-9 is also expanded further in this example into sub-lists 213 through 215 of specific volume object icons. The sub-lists 213 through 215 show specific volumes (e.g., "vol01" through "vol05") that store data for each specific operating system types as indicated by arrangement icons 210-7 through 210-9, and also show the respective storage systems 150 upon which those particular volumes reside.

Note the non-hierarchical nature of the relationships shown in this portion of the GRUI 200. While each arrangement icon 210-7 through 210-9 corresponding to one of the operating systems MVS, Unix or Windows NT shows the volumes associated with those operating system in a hierarchical fashion (i.e., underneath and indented to the right), the storage systems 150 that contain the actual volumes are not a hierarchical relationship with respect to the operating system type. In other words, the volumes for a particular operating system may be spread across different storage systems in a non- hierarchical manner, but the GRUI 200 of the invention allows this to be intuitively represented as indicated in the figure.

The system of the invention allows the user to designate the specific relationships that he or she wants to view (as will be explained next), and then displays the results in a manner such as that shown in FIG. 2. This allows, for example, an object icon that represent an object descriptor in memory to be displayed in the GRUI 200 in more than one place. This may frequently occur in non-hierarchical relationships. For instance, as indicated in sub-list 213 under the "MVS" operating system arrangement icon 210-7, the GRUI 200 displays an object icon for volume number five on storage system number seven ("vol5@Symm07") since this volume can store MVS data. However, the GRUI 200 lists an object icon for this same volume ("vol5@Symm07") in the sub-list 215 under the "Windows NT" arrangement icon 210-9, indicating that this same volume can also store Windows NT data. As another example, volume number five on storage system number eight appears as an object icon labeled "vol5@Symm08" in the sub-list 215 under the "Windows NT" arrangement icon 210-9, while a representation of this same volume also appears in the sub-list 212 under the "Volumes" arrangement icon 210-4 as the object icon labeled "vol05." These are examples of how the GRUI 200 can use a hierarchical style display to represent non-hierarchical relationships. Further examples of this capability provided by the invention will be apparent in the description of other figures.

Figure 3:
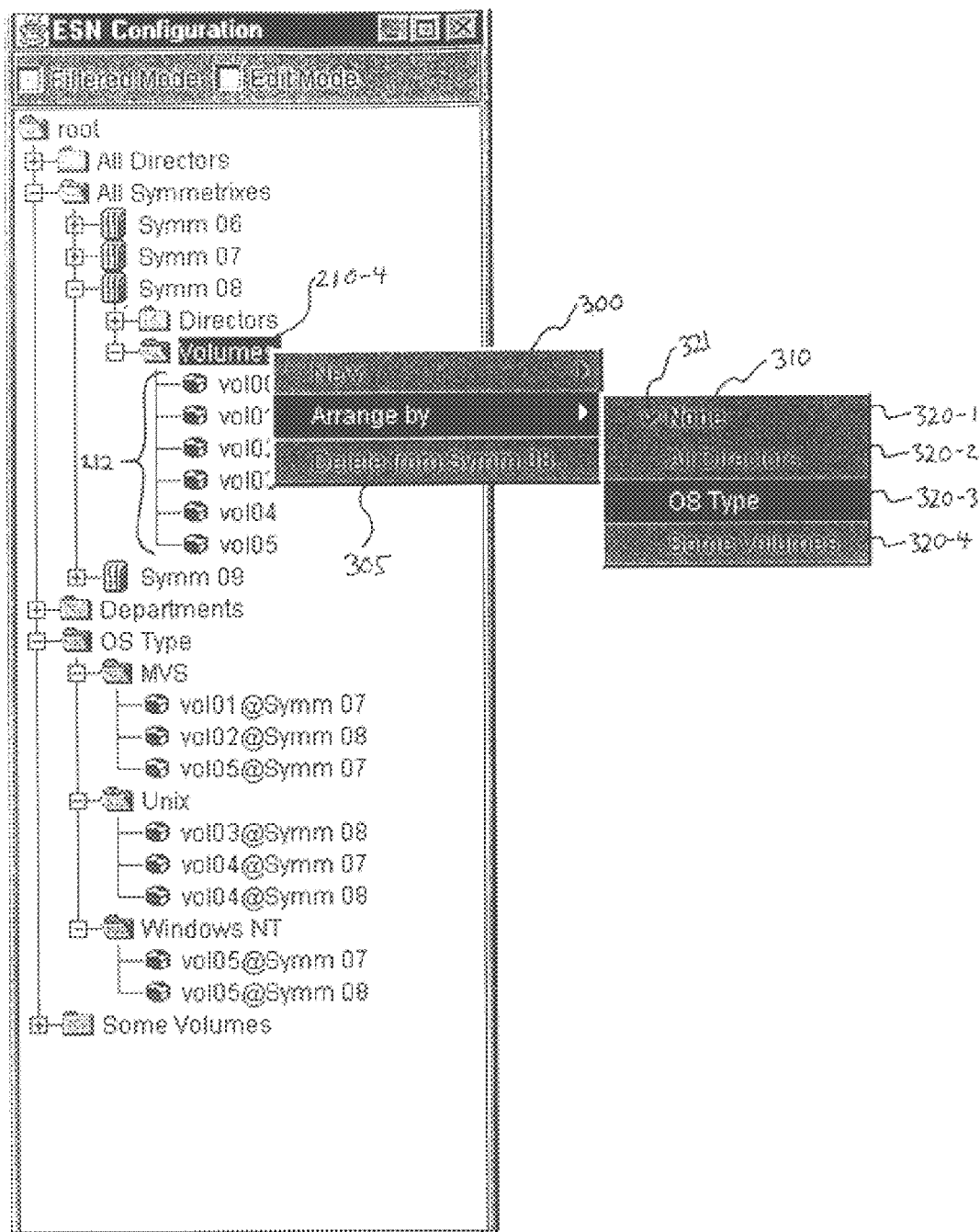
FIG. 3 illustrates how a user can select a relationship selection by which to view the graphical user interface configured according to an example embodiment of the invention.

FIG. 3 illustrates an example operation of the GRUI 200 provided by the invention that allows a user to first select an icon on the GRUI 200 and then to further select a relationship that corresponds to the icon selected by the user. As will be explained, the user can select a specific relationship in order to further display and/or arrange other icons (arrangement and object icons) that relate to the selected icon in various ways via sorting, categorizations and the like. In this particular example, a user selects the "Volumes" arrangement icon 210-4 by clicking and holding the mouse pointer 110-4 (FIG. 1) on the arrangement icon 210-4 which causes the GRUI 200 to display selection menu 300. When the user selects (clicks and holds) the arrangement icon 210-4, all menus 300, 310 displayed and all menu selections made are in response to the originally selected icon (210-4 in this example). When the selection menu 300 appears, the user can depress and hold down a button (not specifically shown) on the input device 110-2 (FIG. 1) and can "drag" the input device 110-2 to the right, which causes the GRUI 200 to display a relationship menu 310. In this example, a user selects the relationship menu 310 by selecting the "Arrange by" selection within the selection menu 300. Menu selections made in this manner are common to many graphical user interface-based applications, though these particular menus and their associated selections are unique to this invention.

Within the relationship menu 310, the GRUI 200 displays any relationships 320 that are available for selection by the user. The relationships 320 (320-1 through 320-4 in this example) that appear in the relationship menu 310 each correspond to relationship functions (to be explained) that the system of the invention can perform with respect to descriptors (object and/or arrangement descriptors) related to the icon 210-4 that the user originally selected which caused the selection and relationship menus 300 and 310 to appear. As will also be explained later, the specific relationships 320 that appear in the relationship menu 310 can be dynamically generated based on the original icon selected, or they may be statically defined within a descriptor in memory corresponding to the selected icon.

In this example, the GRUI 200 displays relationships 320-1 through 320-4 which include "None," "All directors," "OS Type" and "Some Volumes." The "None" relationship 320-1 includes a check mark 321 to the left indicating to the user that the current view of the "Volumes" sub-list 212 (i.e., the list of volumes within the Symm08) is displayed on the GRUI 200 using no particular relationship, arrangement or organization. In this example, the user selects the "OS Type" relationship 310-3 and releases the button on the input device 110-2 which causes the management application 115 to re-display the GRUI 200 as shown in FIG. 4.

Figure 4:
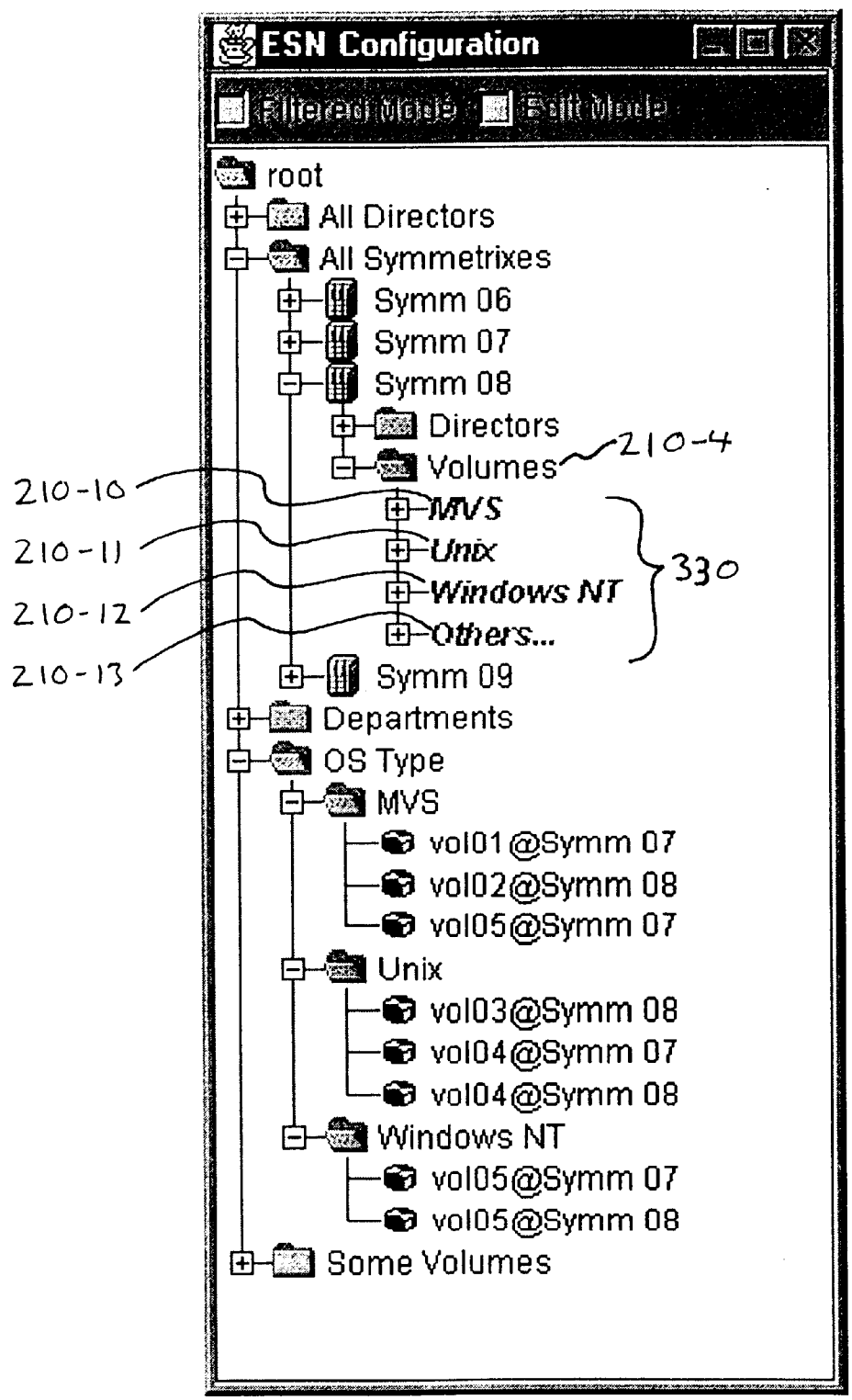
FIG. 4 illustrates a resulting graphical user interface configured according to this invention that is produced from the user interaction illustrated in FIG. 3.

FIG. 4 illustrates the resulting GRUI 200 as it appears after the user selects the "OS Type" relationship 310-3 from the relationship menu 310 in FIG. 3. As illustrated in FIG. 4, the GRUI 200 has replaced the sub-list 212 (FIG. 3) of object icons listing various volumes under the arrangement icon 210-4 with a sub-list 330 of newly displayed operating system arrangement icons 210-10 through 210-13. The arrangement icons 210-11 through 210-13 each correspond to one operating system type within an entire set of operating systems in use on any of the volumes within the "Symm08" storage system as listed in the sub-list 212 (FIG. 3). In other words, when the user selects the "OS Type" relationship 320-3 in FIG. 3, the management application 115 performs a relationship function that first determines and then sorts, categorizes or otherwise organizes (to be explained later) the various operating system types represented within any of the volumes listed in sub-list 212. The management application 115 then re-displays the GRUI 200 with the sub-list 330 of new arrangement icons 210-10 through 210-13 for each operating system type that the relationship determined (i.e., detected). In the example resulting display shown in FIG. 4, the specific operating system types shown as arrangement icons 210-10 through 210-13 are MVS, Unix, Windows NT and Others.

As will be explained in more detail later, to obtain the arrangement icons 210-10 through 210-13 shown in FIG. 4, the management application 115 performs a relationship function defined by the "OS Type" relationship selection 320-3 made from the relationship menu 310 by the user in FIG. 3. Generally, the "OS Type" relationship function determines, for each volume object descriptor (not shown in this figure) in memory 110-5 (FIG. 1) corresponding to a volume object icon in sub-list 212, an operating system group: (one per operating system type, to be explained) to which that volume is a member. Then, for each different operating system group to which a volume listed in sub-list 212 is a member, the management application 115 creates an arrangement descriptor in memory 110-5 and produces a corresponding arrangement icon as a display result for displaying on the GRUI 200. In other words, for each different operating system type determined to be represented by one or more of the volumes listed in sub-list 212 in FIG. 3, the management application 115 creates an arrangement descriptor and produces a display result having a corresponding arrangement icon (one of 210-10 through 210-13) to represent each different operating system type. The management application 115 then displays the display result in the GRUI 200 as shown in FIG. 4. That is, the GRUI 200 displays the newly created arrangement icons corresponding to each newly determined arrangement descriptor in memory that are produced as a result of the relationship function.

Also as shown in FIG. 4, each arrangement icon 210-10 through 210-13 in the sub-list 330 is expandable, as indicated by the "+" symbols to their left. If the user decides to expand operating system type arrangement icons 210-10, 210-11 and 210-13, the management application 115 produces the GRUI 200 that appears in FIG. 5.

Figure 5:
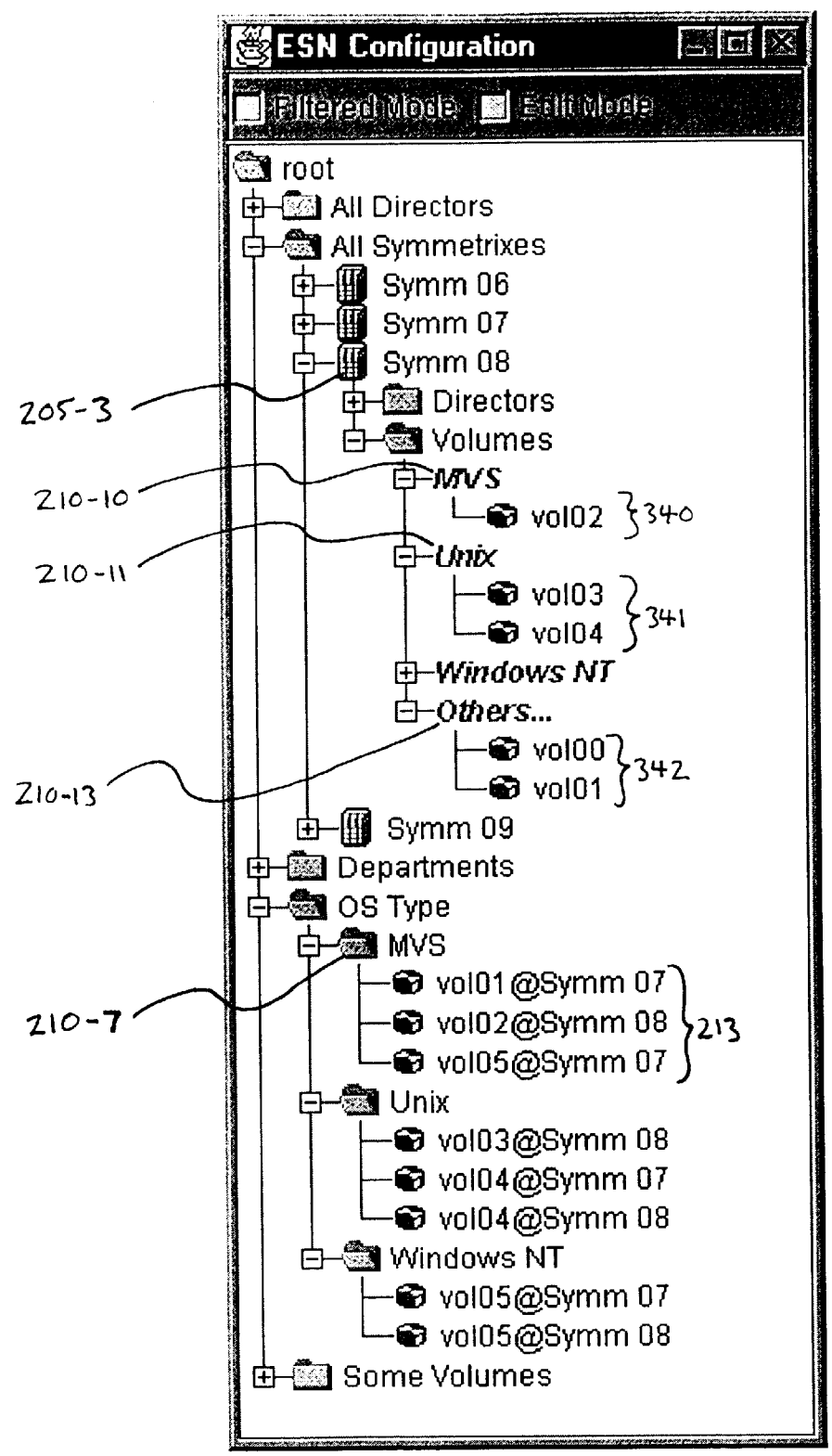
FIG. 5 illustrates how, according to this invention, icons produced in the transition of the graphical user interface from FIG. 3 to FIG. 4 can be further expanded to view other icons and relationships between those icons.

As shown in FIG. 5, the user's expansion of the MVS arrangement icon 210-10 produces a sub-list 340 of only one volume ("vol02") that resides within the "Symm08" storage system 150 that contains an MVS filesystem or MVS data (or that is otherwise accessed via MVS). Similarly, the user's expansion of the Unix arrangement icon 210-11 produces a sub-list 340 of two volumes ("vol03" and "vol04") that reside within the "Symm08" storage system 150 and that contain an Unix filesystem or data (or that are otherwise accessed via Unix). Note that the GRUI 200 indicates that the volumes "vol00" and "vol01" in sub-list 342 under the "Others . . . " arrangement icon 210-13 are not related to MVS, Unix or Windows NT operating system types.

Figure 6:
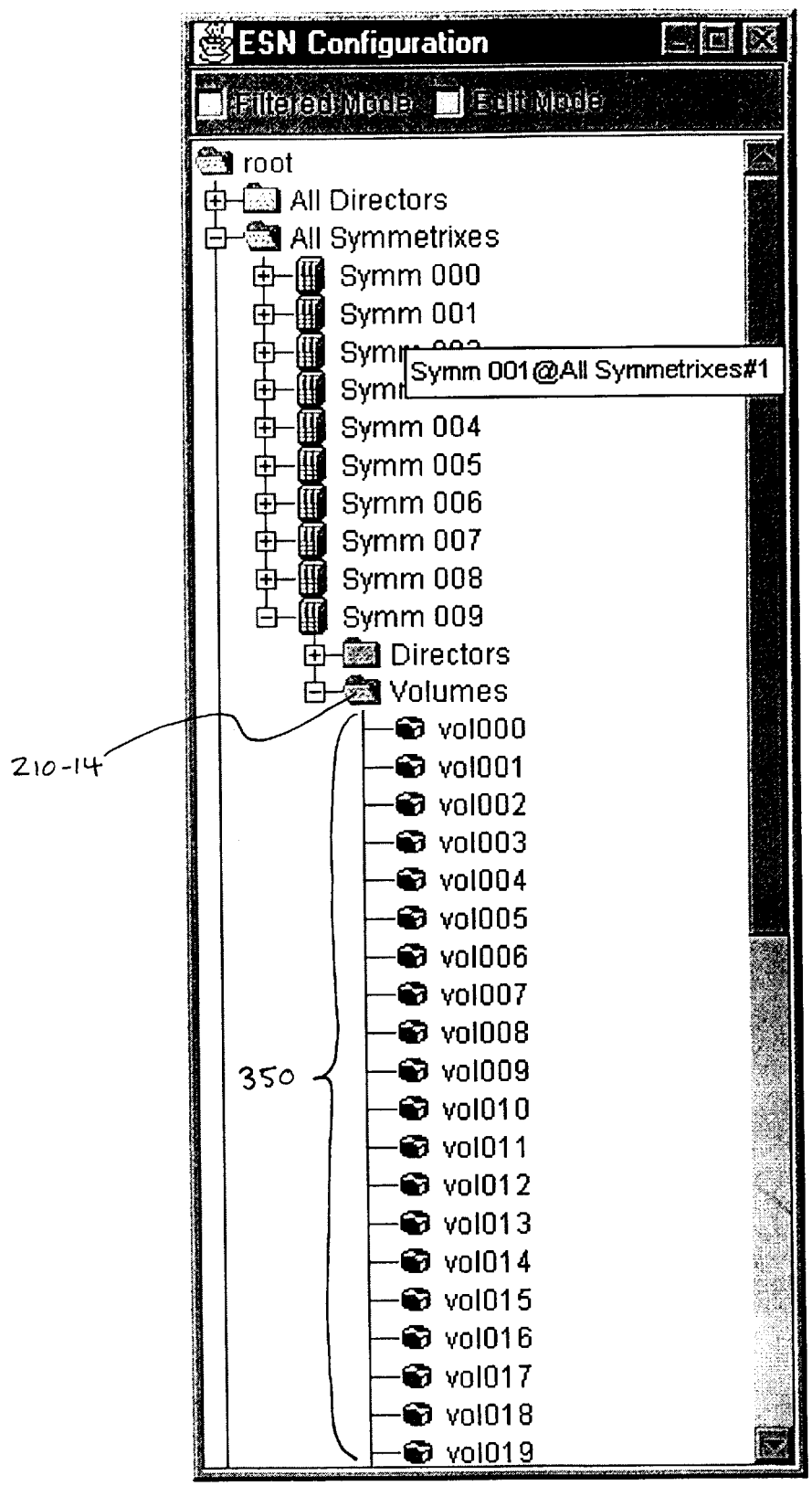
FIG. 6 illustrates a long list of icons that the system of the invention can condense according to a relationship function provided by embodiments of this invention.

FIG. 6 illustrates an example view of the GRUI 200 that may appear when a user expands an arrangement icon such as 210-14 to produce a long sub-list 350 of other icons. Such a long sub-list 350 can quickly degrade the effectiveness of viewing the GRUI 200, since the large number of icons require up a large portion of the viewable area with the GRUI 200. To solve this dilemma, the system of the invention provides a relationship function that can condense the view of the sub-list 350 (or other such long icon lists) into a reduced representation.

Figure 7:
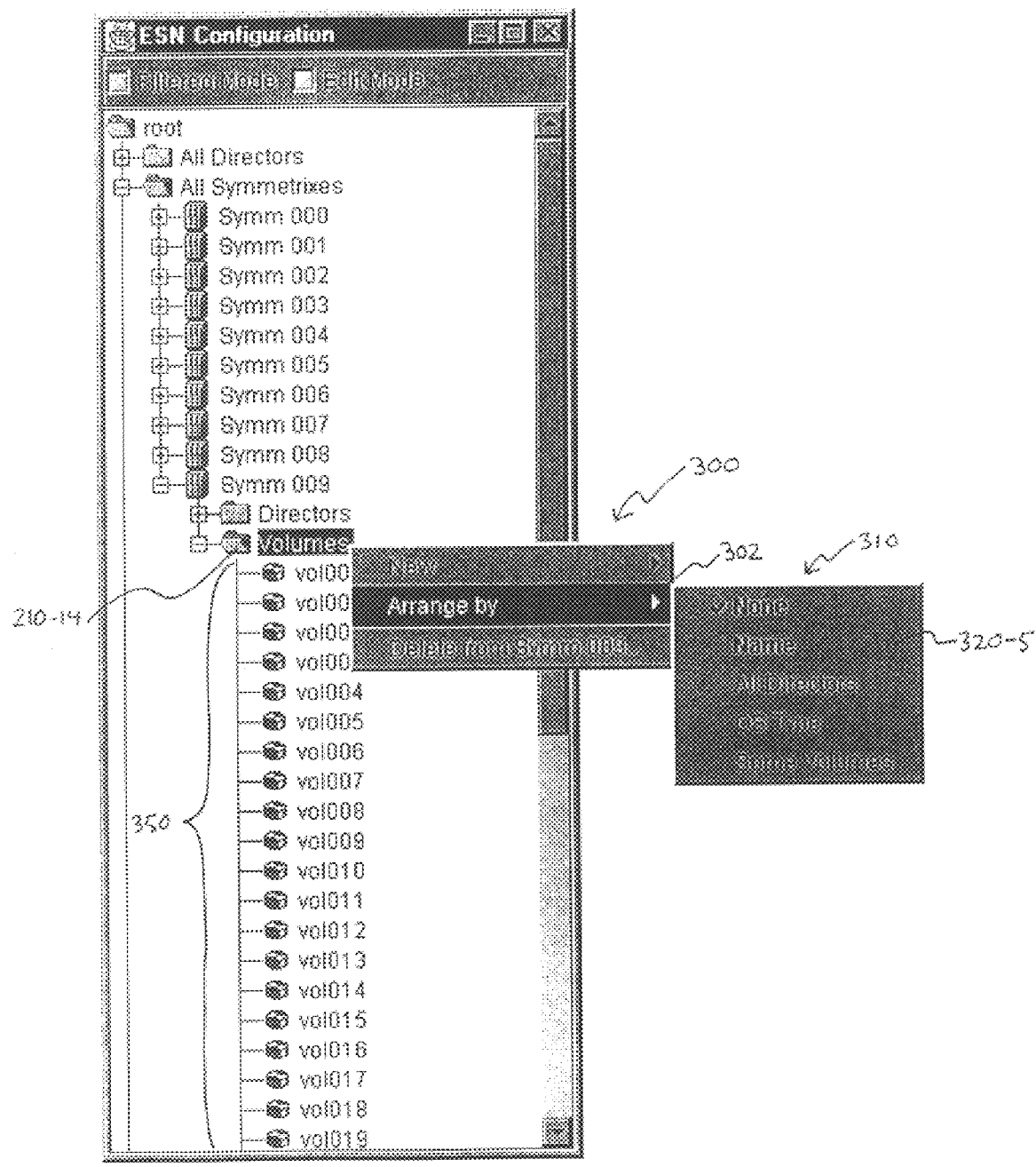
FIG. 7 illustrates how a user can select a specific relationship function to condense a large list of icons according to embodiments of this invention.

FIG. 7 illustrates the operation of a user selecting a relationship selection 320-5 that causes the management application 115 to perform a reduced representation relationship function to reduce the number of icons displayed in a sub-list 350. To make the selection, the user can "click and hold" the pointer (110-4, FIG. 1) on the parent icon 210-14 of the long sub-list 350, which causes the GRUI 200 to display the selection menu 300. The user can then select (via dragging the pointer 110-4 down and to the right) the "Arrange by" selection 302 in the selection menu 300 to display the relationship menu 310.

In a preferred embodiment of the invention, the management application 115 dynamically determines the relationship selections 320 that appear as being available for user selection in a relationship menu 310 based upon various factors. In this example, a relationship 320-5 labeled "Name" is now available for user selection. The "Name" relationship selection 320-5 appears when there are numerous icons (e.g., sub-list 350) descending from (i.e., displayed below) the same parent icon (arrangement icon 210-14 in the example) in the GRUI 200. In other words, in this embodiment, the "Name" relationship selection 320-5 appears when the icons in sub-list 350 exceed a predetermined number. It is to be understood that the Name relationship selection can, however, appear in any relationship menu 310 that relates to (i.e., that is "pulled-down" from) an icon containing one or more lengthy sub-lists listed beneath the icon.

In this example, a user may have difficulty determining from viewing the GRUI 200 how many volume icons (vol00, vol01, . . . Vol48 and so forth) are actually present in the sub-list 350 due to its length. As such, the "Arrange by" selection 302 from the selection menu 300 followed by the "Name" relationship selection 320-5 in relationship menu 310 causes the management application 115 to perform a Name (or condense) relationship function that produces a display result that the management application 115 re-displays in the GRUI 200 as shown in FIG. 8.

Figure 8:
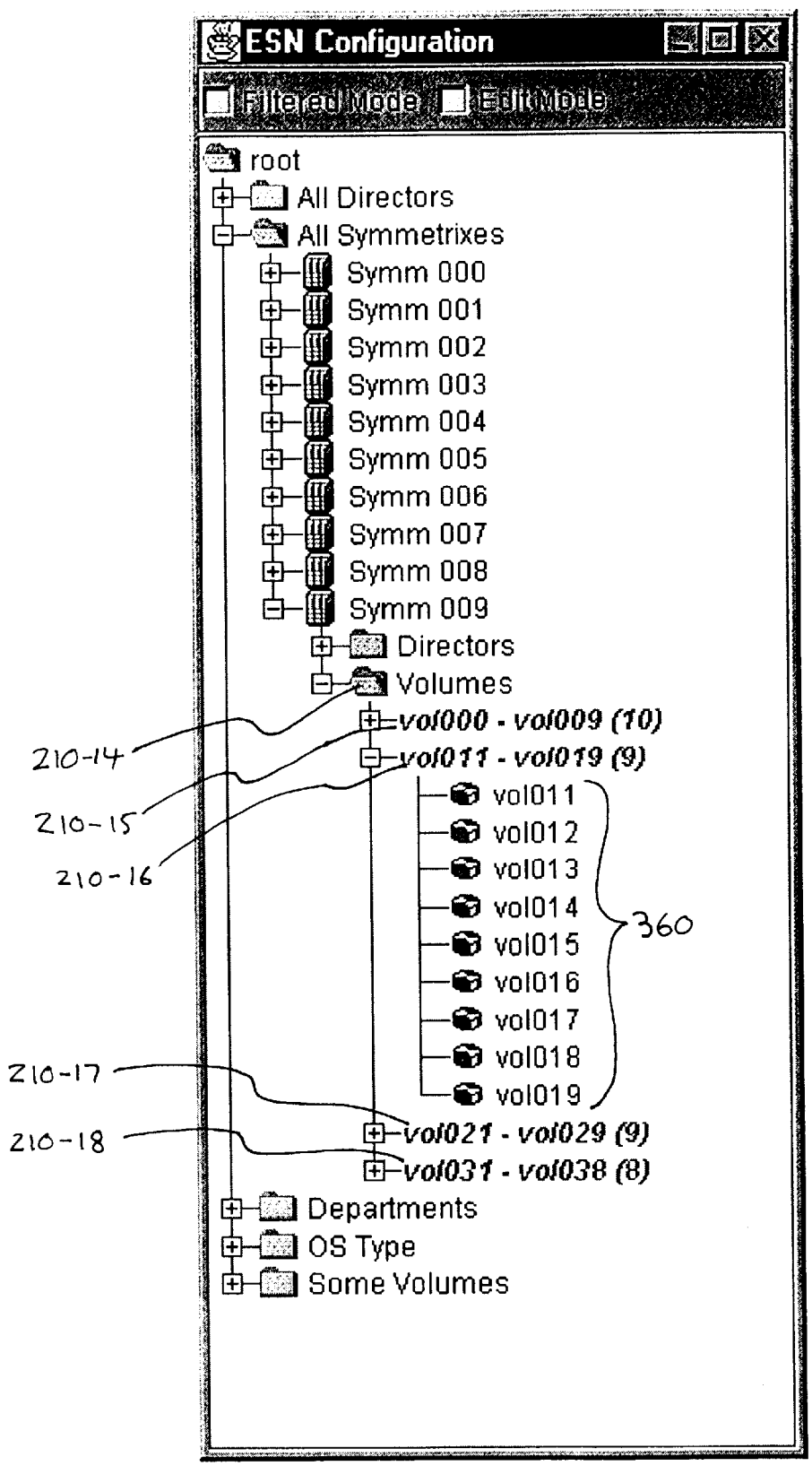
FIG. 8 illustrates a resulting condensed view of the graphical user interface of this invention in response to the user relationship selection in FIG. 7.

FIG. 8 illustrates how the "Name" relationship function (which the management application 115 performs in response to a user selecting the Name relationship selection 320-5 in FIG. 7) can significantly reduce the number of entries in a long list of icons. This relationship function is also called the condensed view relationship function. In this particular example, the sub-list 350 of volume object icons from FIGS. 6 and 7 has been reduced or condensed to four arrangement icons 210-15 through 210-18, labeled respectively "vol100–vol09 (10)," "vol11–vol 19 (9), ""vol21–vol29 (9)" and "vol31–vol39 (8)". The arrangement icons 210-15 through 210-18 are called series arrangement icons, since each represents a series of two or more icons, which in this example are volume object icons. Each series arrangement icon 210-15 through 210-18 thus indicates what volumes are represented by that icon. In this example, the series arrangement icon 210-16 is shown in expanded form to reveal a sub-list 360 of the nine volume icons. This aspect of the invention thus allows a user to further condense the relationships the GRUI 200 presents.

One technique of the invention that can be used to reduce the number of icons displayed in a long list is to compute the square root of the number of icons to be displayed in the long list. In the example in FIG. 7, the system of the invention can compute the square root of the number of icons in the sub-list 350. The resulting value indicates how many series arrangement icons (e.g., 210-15 through 210-18) are to be created and displayed in the GRUI 200, each having a name that preferably helps identify the object icons which each series arrangement icon represents. If the square root does not compute evenly, then one extra series arrangement icon can be incorporated into the sub-list to represent and display the remainder of icons that do not correspond to the series arrangement icons for each value of the square root. In a non-specific example, if there were fifty-two icons to be displayed below a selected icon, this "condensing" operation of the invention would result in seven series arrangement icons, as seven is the square root of forty nine, and one additional series arrangement icon to represents the icons numbered fifty, fifty-one and fifty-two.

Example Implementations of Embodiments of the Invention

Figure 9:
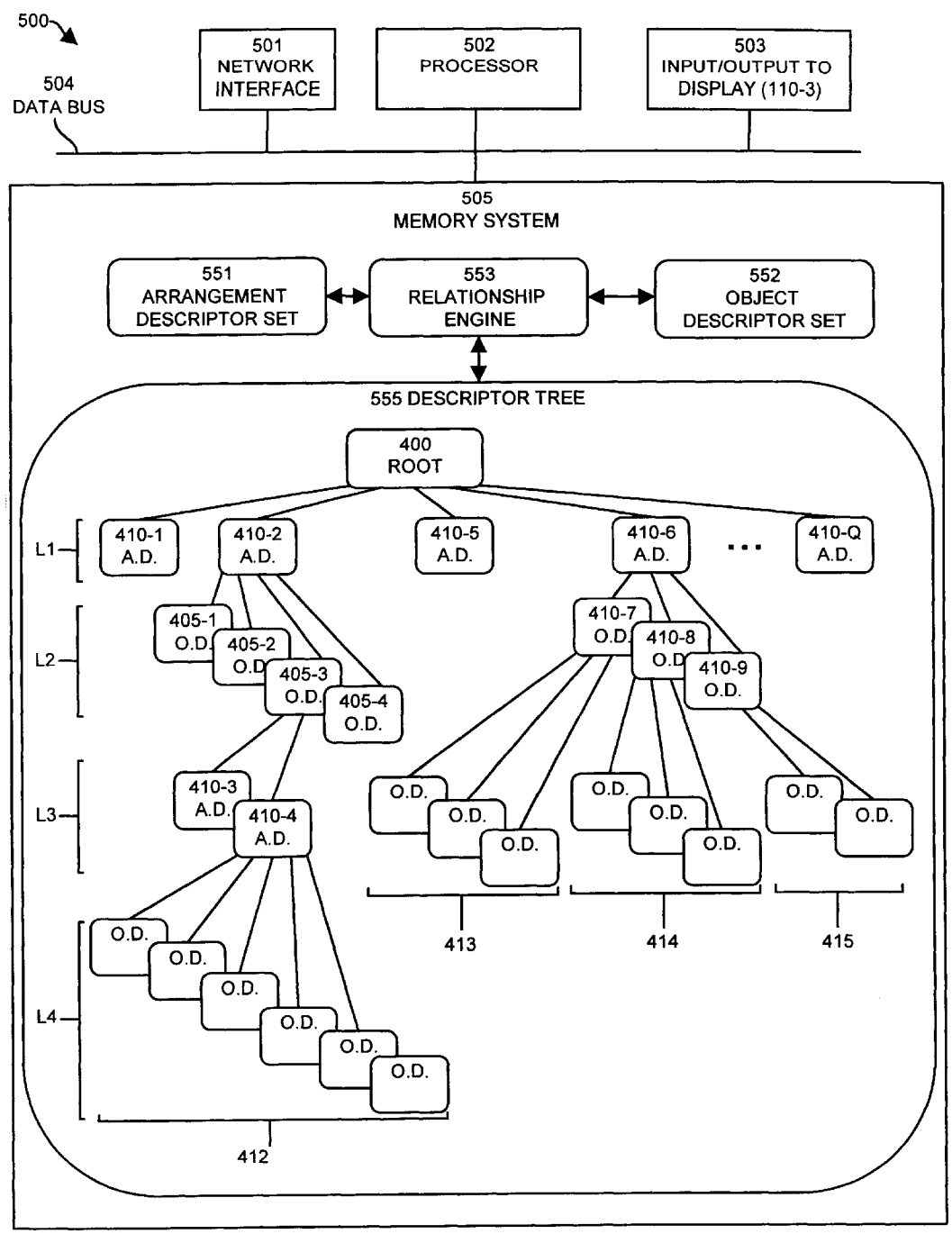
FIG. 9 illustrates an example internal architecture of a computer system configured according to an embodiment of this invention.

FIG. 9 shows an internal architecture 500 of a computing system (e.g., 110 in FIG. 1) configured according to an example embodiment of the invention. The architecture 500 includes a data bus 504 that couples a network interface 501, a processor 502, an input/output display mechanism 503

(i.e., for providing the GRUI to a computer display such as 110-3 in FIG. 1) and a memory system 505. The network interface 501 provides communications between the computing system (e.g., 110, shown here as architecture 500) and other entities such as computing systems 120 through 140 and storage systems 150 in FIG. 1. The input/output mechanism is used to render or otherwise display images, text and/or graphics, including the GRUI 200 of this invention, on a computer display terminal or monitor such as 110-3 in FIG. 1. The processor 502 provides the general processing power of the computing system architecture 506 and may be any type (or number) of microprocessor(s). A preferred embodiment of the architecture 500-is any type of workstation of computer such as a RISC-based Unix workstation (e.g., a Sun Workstation manufactured by Sun Microsystems of Mountain View, Calif.), or the architecture 500 may be a PC-based (e.g., Intel based) workstation commonly known as a personal computer. The architecture 500 shown in FIG. 9 is provided as an example only, and is not meant to limit the applicability of this invention to a particular computer type.

The memory system 505 is encoded with data structures and code which in this example include an arrangement descriptor set 551, an object descriptor set 552, a relationship engine 553 and a descriptor tree 555. The relationship engine 553 contains logic instructions (e.g., computer program code) that provide the GRUI 200 of the invention. The management application (115 in FIG. 1) incorporates the relationship engine 553 as a portion of the management application responsible for GRUI 200 display management. That is, while the management application 115 from FIG. 1 is not explicitly shown in the memory system 505 in FIG. 9, the relationship engine 553 is the portion of the management application that provides the main functionality of the invention.

Generally, in operation of the system in FIG. 9, the processor 502 performs (i.e., executes, interprets, or otherwise processes) the relationship engine 553 which operates according to the techniques of the invention as explained herein.

One processing task of the relationship engine 553 is to maintain the descriptor tree 555. The descriptor tree 555 is a tree data structure (in this example, not meant to be limiting of the invention however) that provides the underlying object descriptor data structures 405 (labeled "O.D.") and arrangement descriptor data structures 410 (labeled "A.D.") that the relationship engine 553 uses to render or otherwise display the GRUI 200 on a computer display (e.g. 110-3 in FIG. 1) via the display input/output mechanism 503. That is, as explained above with respect to the example GRUI 200 in FIGS. 2 through 8, each object icon and arrangement icon 205, 210 in the GRUI 200 represents (i.e., is rendered or displayed by the relationship engine 553 on behalf of) a respective corresponding object descriptor 405 or arrangement descriptor 410 that the relationship engine 553 maintains in the descriptor tree 555 within memory system 505.

The specific configuration of this example descriptor tree 555 in FIG. 9 corresponds to the GRUI 200 shown in FIG. 2. That is, the descriptor tree 555 in FIG. 9 represents the object and arrangement descriptors 405, 410 that the relationship engine uses to render the object and arrangement icons 205, 210 in FIG. 2. Object descriptors 405-1 through 405-4 (FIG. 9) thus correspond to object icons 205-1 through 205-4 (FIG. 2), while arrangement descriptors 410-1 through 410-9 correspond to arrangement icons 210-1 through 210-9. Sub-lists 412 through 415 of the object descriptors labeled "O.D." (each without a specific reference numeral) correspond to the sub-lists 212 through 215 of the icons in FIG. 2.

The arrangement descriptor set 551 and the object descriptor set 552 in the memory system 505 contain a list of all arrangement and object descriptors that exist in the memory system 505 and that the relationship engine 553 can access, regardless of if those descriptors are positioned within the descriptor tree 555. In other words, there may be some descriptors (arrangement or object) that are not in use by the relationship engine 553 or that the relationship engine 553 has not yet placed in the descriptor tree 555 for display in the GRUI 200. The descriptor tree 555 may thus represent a subset of the entire set of descriptors available with the arrangement and object descriptor sets 551, 552. In a preferred embodiment, the relationship engine 553 builds up the descriptor tree 555 as required for display purposes. The tree 555 is built or expanded (i.e., descriptors added) typically in response to a user requesting expansion of an icon 205, 210 on the GRUI 200, or in response to the user selecting a relationship function (to be explained) for an icon 205, 210 that causes the relationship engine 553 to further define or re- organize (and re-display) the tree 555.

Figure 10:
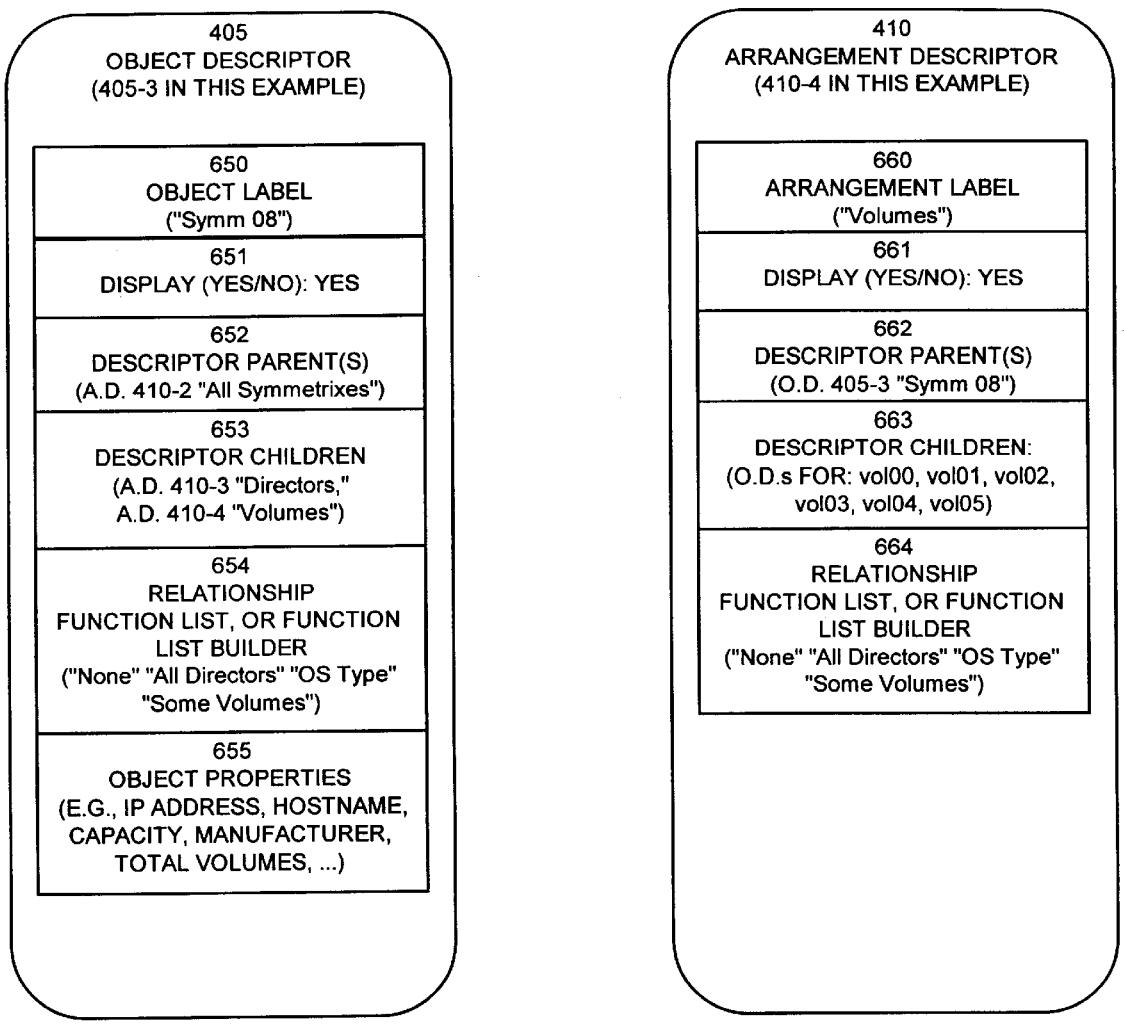
FIG. 10 illustrates an example of the content of object descriptors and arrangement descriptors according to one embodiment of this invention.

FIG. 10 illustrates an example of the content that the relationship engine 553 can maintain within an object descriptor 405 (405-3 in this example) and an arrangement descriptor 410 (410-4 in this example). The object and arrangement descriptors 405 and 410 may be classes, for example, in a object-oriented programming environment.

Both the object descriptor 405 and the arrangement descriptor 410 include a label field 650, 660, respectively, which stores the label or identity for that descriptor. The relationship manager 553 can use the label fields 650, 660 to label each corresponding object or arrangement icon 205, 210 that represents those descriptors on the GRUI 200.

Each object descriptor 405 and the arrangement descriptor 410 also includes a label field 650, 660, respectively, which indicates to the relationship engine 553 if that descriptor is to be displayed on the computer display (e.g., 110-3 ) or not. As noted above, the relationship manager 553 can build up the descriptor tree 555 in response to various events such as user expansion of an icon 205, 210 or when a user selects a relationship function. Likewise, a user can choose to collapse an icon on the GRUI 200. However, collapsing an icon (205, 210) on the GRUI 200 preferably only effects the GRUI 200, and the descriptor tree 555 in memory does not remove or delete the descriptors 405, 410 that correspond to the icons that are no longer on display due to the collapsing operation. Descriptors (nodes) in the descriptor tree 555 are thus cached for future use (e.g., if needed for re-display purposes). As such, the display fields 650, 660 can indicate to the relationship engine if a descriptor is supposed to have a corresponding icon on the computer display 110-3 or not.

Each object and arrangement descriptor 405, 410 also includes a descriptor parent field 652, 662 and a descriptor children field 653, 663. These parent and child fields 652, 662 and 653, 663 contain lists of, or pointers to, other descriptors 405, 410 that are related to the descriptor (the current descriptor) containing these-fields. The parent fields 652, 662 thus indicate which descriptor 405, 410 are the parent descriptors of (i.e., relate to) the current descriptor, while the children fields 653, 663 indicate what descriptors are children (or that depend from) the current descriptor.

A descriptor 405, 410 that has children is said (i.e., is to be understood), for purposes of explaining this invention, to be the group for those children and a descriptor that is a child is said to be in the group of its parent. For example, the "Volumes" arrangement descriptor 410-4 which is shown in detail in this example in FIG. 10 has six child object descriptors "vol00" through "vol05" (corresponding to icons in sub-list 212, and object descriptor icons in sub-list 412 in the memory system 505). These six child descriptors (i.e., these six volumes) are said to be in the "Volumes" group for the storage system "Symm 08," which is the parent of the "Volumes" descriptor 410-4. As a more general statement, icons that depend from (i.e., are the direct children of) a parent icon are in the group of the parent icon, indicated by the parent icon label 650, 660. As an example of this general principle, referring to FIG. 2, a user can consider the "OS Type" arrangement icon 210-6 to be an operating system group, and "MVS", "Unix" and "Windows NT" may be considered to be in, or children of, the operating system group "OS Type".

The example object descriptor 405 and arrangement descriptor 410 each also include a relationship function list field 654, 664. Generally, the relationship function list fields 654, 664 can include a list of the various relationship functions (to be explained) that relate to this particular object or arrangement icon 405, 410. Relationship functions define how the relationship engine 553 should sort, arrange, or otherwise manipulate the icons 205, 210 on the GRUI 200, and possibly the descriptors 405, 410 corresponding to those icons 205, 210, in response to the user selecting one of the available relationships defined in this field 654, 664. Details of how the relationship function explained in the examples provided with respect to FIGS. 2 through 8 will be provided shortly.

In some embodiments, as indicated by terminology "FUNCTION LIST BUILDER" within the field 664 in FIG. 10, the relationship function list field 664 may actually be a function list builder which can dynamically determine any relationships that are currently applicable (i.e., selectable by a user from the relationship menu 310) to icon 205, 210 (to that icons descriptor 405, 410) selected by a user. That is, in one embodiment, the list of relationships that the relationship engine 553 maintains within the relationship function list field 654, 664 field is static, with each available relationship simply pre-defined in the object or arrangement descriptor 405, 410. However, in a preferred embodiment, the relationship engine 553 can dynamically deduce the available relationships that are applicable via a relationship and user selectable for a particular descriptor 401, 410 (and hence for its corresponding icon 405, 410 via the relationship menu 310 on the GRUI 200).

The example object descriptor 405 further includes an object properties field 655. This field 655 contains information concerning actual properties or attributes of the object (e.g., hardware, software application, or the like) described by the object descriptor 405 in which the field 654 is contained. The example of the object properties field 655 in FIG. 10 includes an IP address, hostname, storage capacity (since this object descriptor is used to maintain information about a storage system such as 150 in FIG. 1), manufacturer, total number o volumes, and so forth. Properties may include names of members of a group. For instance, if an "Operating Systems Supported" property were listed, it might contain a reference to various members (arrangement or object descriptors) that are referenced by the operating system group arrangement descriptor 410-6 represented on the GRUI 200 by the "OS Type" arrangement icon 210-6 (FIG. 2).

Figure 11:
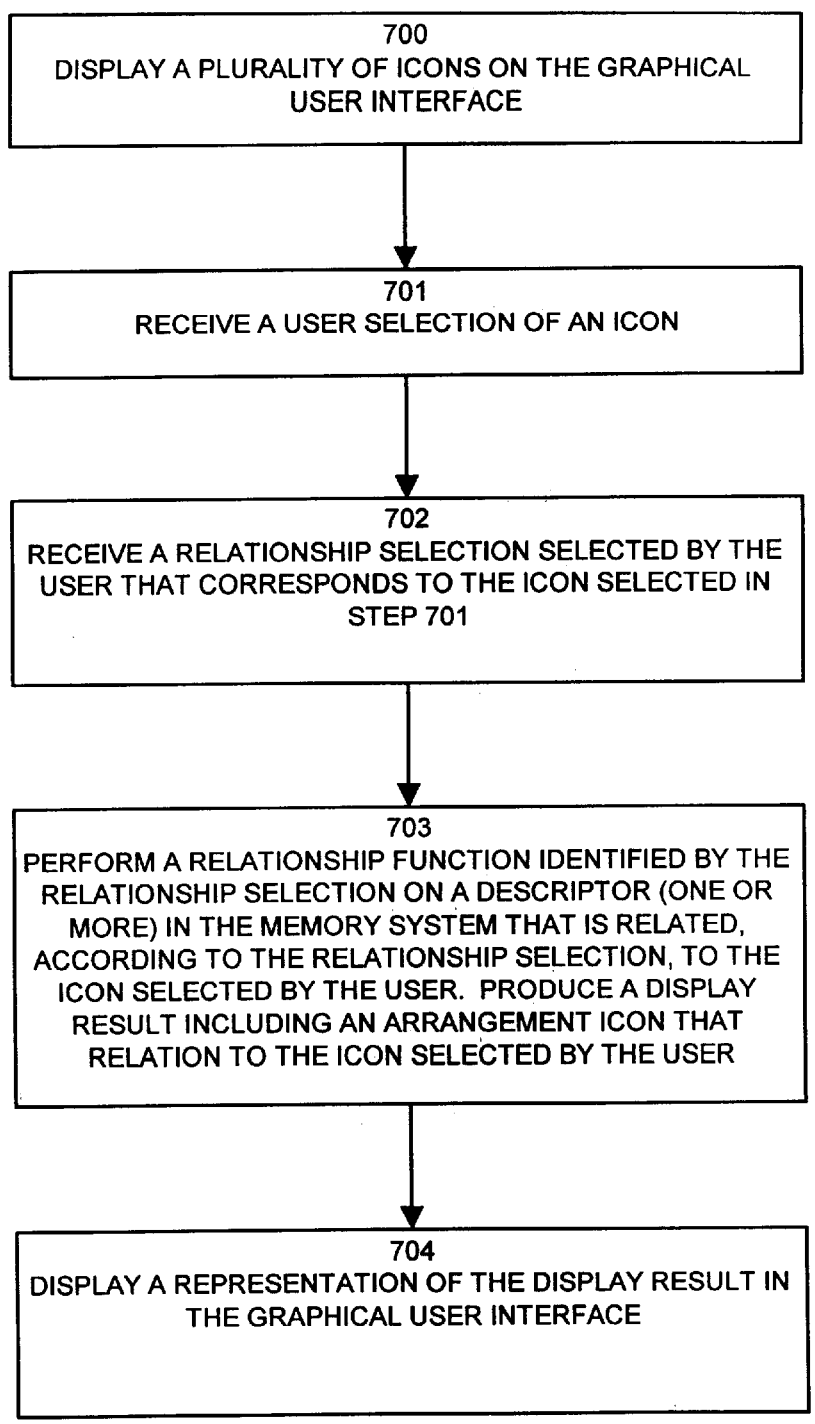
FIG. 11 is a flow chart of the processing steps carried out by a software application to provide a graphical user interface according to one embodiment of this invention.
Figure 12:
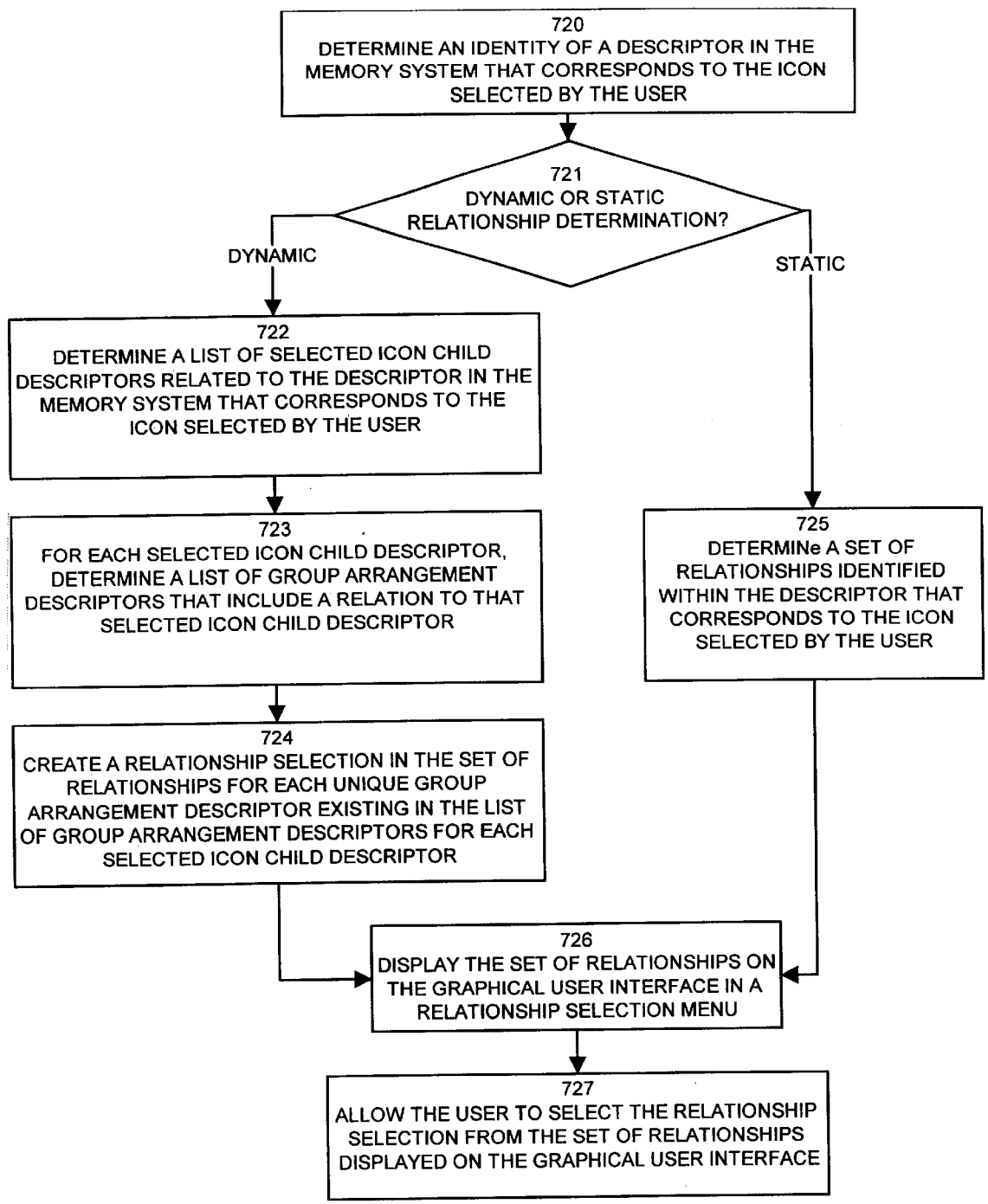
FIG. 12 is a flow chart of the processing steps performed according to one embodiment of this invention to present relationship selections to a user and to retrieve a relationship selection from a user.
Figure 13:
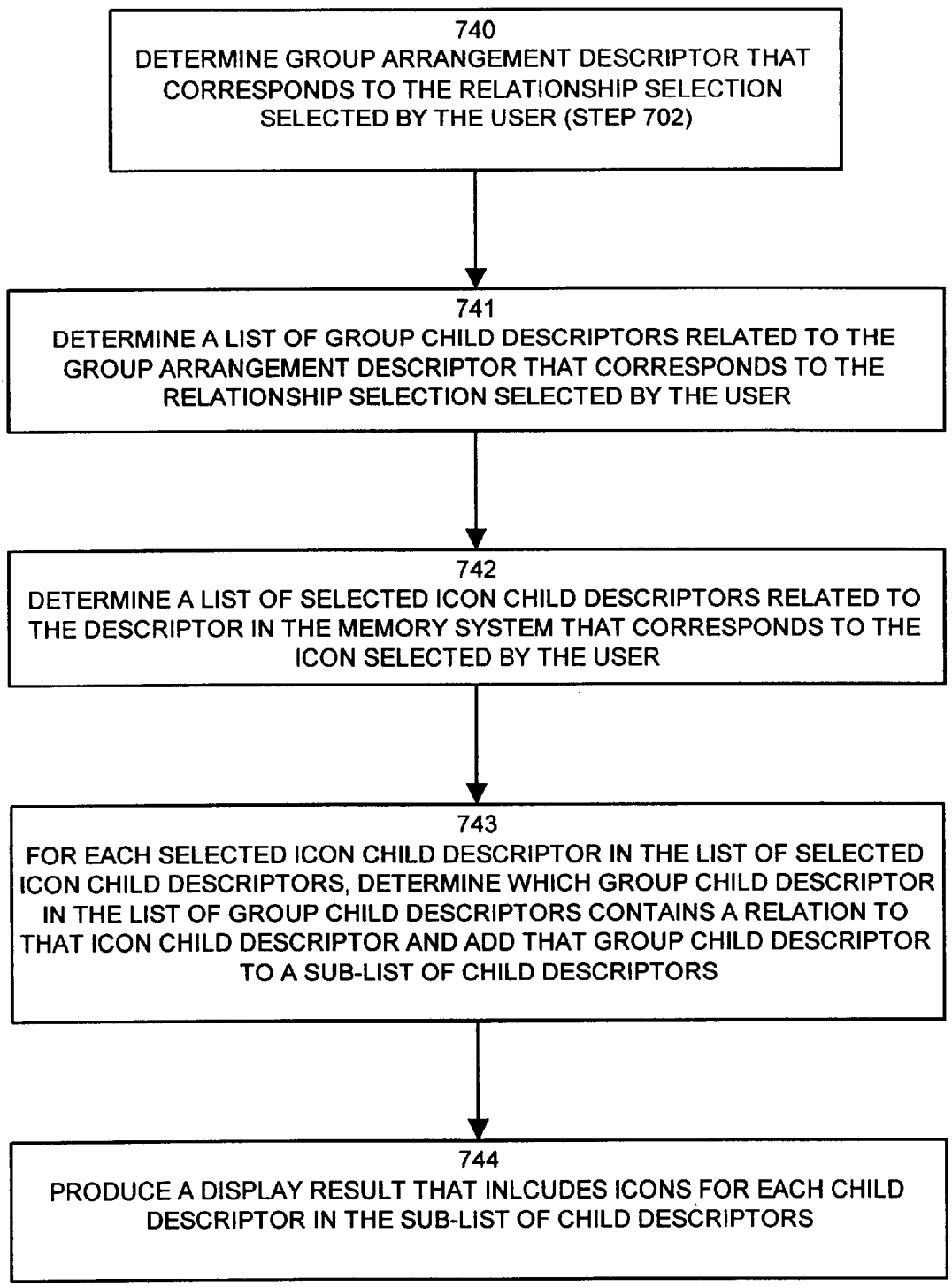
FIG. 13 is a flow chart of the processing steps performed according to one embodiment of this invention to perform a relationship function that produces a display result based on a relationship selection made by a user.

FIGS. 11 through 13 illustrate various operations performed by the relationship manager 553 according to embodiments of the invention to produce the views and functionality of the GRUI 200 as previously discussed. Preferably, the steps in FIGS. 11 through 13 are embodied and performed as software logic instructions (i.e., code) within a relationship engine 553 embedded within an application program (e.g., management application 115) in a memory system (e.g. 110-5) on the computer system (e.g., 110). Such instructions, operations or steps are preferably performed by a processor within such a computer. Throughout this description, the term "the system of the invention" will be used to described what is performing the operations. It is to be understood that "the system of the invention" includes any software or hardware required to provide a graphical user interface as described herein. Also, the descriptions that follow will frequently refer to the example menu and icon selections made in FIGS. 3 and 4 by way of example only.

In FIG. 11, steps 700 through 704 show the general processing step that the invention performs to create and display a graphical user interface (e.g., GRUI 200) as explained above. In step 700, the software displays a plurality of icons on the graphical user interface (e.g, GRUI 200). The icons displayed in step 700 can include both arrangement icons 210 and/or object icons 205. The software may display a graphical user interface such GRUI 200 in FIG. 2, for example. In step 701, the software receives, a user selection of an icon. The user may make such an icon selection, as explained with respect to the former examples, using a user input device (e.g., mouse 110-2, a keyboard, a speech recognition input device, or any other type of user input device). The software preferably produces a display that looks like FIG. 3, where a selection menu 300 appears on the GRUI 200.

In step 702, the software receives a relationship selection selected by the user that corresponds to the icon selected in step 701. As shown in FIG. 3, a preferred embodiment of the invention displays a relationship selection menu 310 that allows the user to select form any relationships that are applicable to the currently selected icon (icon selected in step 701) Details on how the software produces the relationship choices for the relationship selection step 702 will be explained shortly with respect to FIG. 12. In any event, once the user has selected a relationship, the software performs step 703 in FIG. 11 which performs a relationship function identified by the relationship selection. The software performs the relationship function on one or more descriptors in the memory system 505 that are related (e.g., hierarchically, either above as parents or below as children), according to the relationship selection, to the icon selected by the user (e.g., icon 210-4 in FIG. 3). In step 703, the software also produces a display result that includes an arrangement icon (e.g., one of 210-1—through 210-13 in FIG. 4) that relates (e.g., hierarchically "depends from" in the example in FIG. 4) to the icon (210-4 ) selected by the user in step 701.

When the relationship function has produced such a display result, in step 704, the software displays a representation of the display result in the graphical user interface (e.g., GRUI 200 in FIG. 4). In this manner, the system of this invention uses steps 700 through 704 I FIG. 11 to generally allow a user to produce a customized GRUI that shows various relationships as selected by the user. Since a user can expand icons in the hierarchical manner as shown in the figures and as explained above, a user can view multiple relationships at one time on the interface.

Preferably, in step 700, the software displays a hierarchical configuration of object icon 205 and arrangement icons 210, and each object icon 205 represents a respective object descriptor 405 (FIG. 9) within the memory system 505 (FIG. 9) while each arrangement icon 210 represents a respective arrangement descriptor 410 (FIG. 9). Each arrangement descriptor also represents at least one relationship between certain object descriptors 405 within the memory system 505.

FIG. 12 shows steps 720 through 727 which illustrate various ways in which the system of the invention can provide and receive a relationship selection from the user (i.e., steps to carry out step 702 in FIG. 11). Generally, the steps in FIG. 12 provide mechanisms to create the various relationship selections (i.e., the list of selectable relationships) that appear in the relationship menu 310 (FIGS. 3 and 7), and then allow a user to make a relationship selection. In step 720, the system of the invention determines an identity of a descriptor (i.e., one of 405 or 410) in the memory system 505 that corresponds to the icon (e.g., 210-4 in FIG. 3) selected by the user. In other words, as illustrated in FIG. 3, if the user selects icon 210-4, using step 720, the system of the invention obtains the identity of the arrangement descriptor 410-4 (FIG. 9) that corresponds to the selected arrangement icon 210-4. In step 721, the system of the invention determines if relationship determination (i.e., the process of determining what relationships are applicable and selectable for the selected icon) is static or dynamic.

Dynamic relationship selection allows the system of the invention to determine what relationships are applicable to a selected icon each time that icon is selected. To do so, in step 722, the system of the invention determines a list of "selected icon child descriptors" (i.e., descriptor children 653 or 663) that are related to the descriptor (405, 410) in the memory system 505 that corresponds to the icon (e.g., 210-4 in FIG. 3) selected by the user. In other words, in step 722, the system of the invention determines the child descriptors that are hierarchically below the selected icon in the descriptor tree. For the selected icon 210-4, the list of selected icon child descriptors is the set of object descriptors corresponding to the volume icons sub-list 212 in FIG. 2, or more precisely, the object descriptors 412 in FIG. 9.

Next, in step 723, for each selected icon child descriptor, the invention determines a list of group arrangement descriptors (e.g., descriptors 410-1, 410-2, 410-5, 410-6 in FIG. 9) that include a relation (i.e., that have a reference to) that selected icon child descriptor. In other words, in step 723, the invention determines what group(s) each child of the selected icon belongs to. Group arrangement descriptors (and their corresponding arrangement icons 210 in the GRUI 200) are those arrangement icons in level one (L1, FIG. 9) of the descriptor tree 555. That is, in the examples in FIGS. 2 through 8, the group arrangement icons, representing the various groups, are "All Directors," "All Symmetrixes," "Departments," and "Some Volumes." Thus, step 723 causes the invention to determine any groups to which a child of the selected icon belongs. Since the children of the selected icon are volumes "vol00" through "vol05", these object descriptors happen to have a relation (i.e., a hierarchical dependency) from the "MVS" "Unix" and "Windows NT" arrangement descriptors which themselves depend from the group arrangement descriptor "OS Type", as shown graphically in FIG. 3. While not shown in expanded form, these children of the selected icon are also related to the "All Directors" and "Some Volume" groups. In other words, the arrangement descriptors corresponding to the "All Directors" and "Some Volumes" arrangement icons include a relation (i.e., a child reference) to at least one of these volume object descriptors 412.

Next, in step 724, the system of the invention creates a single relationship selection (i.e., a selectable relationship) in a set of relationships for each unique group arrangement descriptor 410 that exists in the list of group arrangement descriptors (determined in step 723) for each selected icon child descriptor. That is, a list is composed of all of the different groups to which children of the selected icon are members (i.e., are related). In the case of the volume object descriptors corresponding to the volume object icons "vol00" through "vol05"that depend from the selected icon 210-4 in FIG. 3, the group list is "All Directors," "OS Type" and "Some Volumes." In this manner, the system can create a dynamic list of any groups that child icons of a selected icon are members. The set of these groups that is unique (i.e., no duplicates) provides the relationships by which the children icons of a selected icon can be arranged and this set is displayed in the relationship menu 310 (to be explained).

Note that if the system of the invention does not use dynamic relationship determination, then the system can process step 725 which determines a set of "hard-coded" relationships that are identified within the descriptor that corresponds to the icon selected by the user. In other words, when a user selects an icon (e.g., 210-4 ), the set of relationships which are applicable (i.e., user selectable) for that icon can be hard-coded into the descriptor (arrangement or object) associated with that icon.

In any event, after the system processes either steps 722 through 724 or step 725, the system processes step 726 in which the system displays the set of relationships on the graphical user interface in a relationship selection menu (e.g., 310 in FIGS. 3 and 7). Next, in step 727, the system of the invention allows the user to select a relationship selection (e.g., 320-3 in FIG. 3) from the set of relationships displayed on the graphical user interface (e.g., GRUI 200). In this manner, the software, program or computer system implementing the invention can obtain the user selection of a relationship by which to organize, arrange, or otherwise display icons.

FIG. 13 illustrates the steps involved to perform a relationship function (e.g., step 703 in FIG. 11) according to one embodiment of the invention. Recall that the system of the invention performs a relationship function based on the user's selection of a relationship, as just explained. Essentially, the selection of a relationship, for this embodiment, defines a group selection. In other words, a user's, relationship selection in this embodiment specifies a group arrangement icon which the system of the invention is to use to organize or arrange the child icons that will be displayed under a selected icon in the GRUI 200 of this invention. As explained above, since the relationship selection is, in this embodiment, actually a group selection, then the purpose of the relationship function is to organize or arrange the children descriptors that relate from the descriptor related to the currently selected icon according to the group selection.

To begin this process, in step 740, the system of the invention determines a group arrangement descriptor 410 that corresponds to the relationship selection selected by the user in step 702 of FIG. 11. For instance, in FIG. 3, if the user selects "OS Type" 320-3 as his or her choice for a relationship selection, the output of step 740 according to this embodiment of the invention is a reference to the group arrangement descriptor 410-6 for the "OS Type" group. Next, in step 741, the system of the invention determines a list of group child descriptors (i.e., the children of the group icon) that are related to the group arrangement descriptor that corresponds to the relationship selection selected by the user. In this example, since the group arrangement descriptor in the "OS Type" arrangement descriptor 410-6, it's descriptors children 663 (FIG. 10) are the "MVS," "Unix," and "Windows NT" arrangement descriptors 410-7, 410-8 and 410-9 (FIG. 9). Essentially, in step 741, the system of the invention determines the children icons (actually, their descriptors) of the group arrangement icon (i.e., the group) specified by the user's relationship selection.

Next, in step 742, the system of the invention determines a list of selected icon child descriptors 410, 405 that are related to the descriptor in the memory that corresponds to the icon selected by the user (e.g., icon 210-4 in FIG. 3). In other words, step 742 is identical in processing to step 722 in FIG. 12.

In step 743, for each selected icon child descriptor in the list of selected icon child descriptors (i.e., for descriptor children 653, 663 related to the selected icon, determined in step 742), the system of the invention determines which group child descriptor in the list of group child descriptors contains a relation to that icon child descriptor and then adds that group child descriptor to a sub-list of child descriptors. In other words, step 741 determines all the children (in the descriptor tree 555) of a group specified by the relationship selection (e.g., all children of the "OS Type" group—which is "MVS," "Unix," and "Windows NT"). Then, step 742 determines all the children of the selected icon, which in this example is the volumes "vol00" through "vol05". The system of the invention in step 743 then determines the intersection of these two sets of descriptors, so that the resulting descriptor set is the non-duplicative set of group children to which any child of the selected icon is referenced. Step 744 then causes the system of the invention to produce a display result that includes icons for each child descriptor in the sub-list (e.g., 412) of child descriptors.

In the example, as shown in FIG. 4, the resulting descriptor set results in the display of icons 210-10 through 210-13. In this manner, the relationship function determines the exclusive set of group children to which any child of the selected icon belongs or is referenced. These icons (e.g., 210-10 through 210-13) can then be expanded as explained above to show the exact volume references within each group. In other words, when the relationship function completed in step 743, each group child descriptor contains a reference to the appropriate selected icon child descriptors and may be expanded to show these arrangements. This results in the selected icon child descriptors being arranged by, categorized into, or sorted according to the child descriptors of the selected relationship. As can be seen from the diagrams and the aforementioned examples, this aspect of the invention provides a very powerful tool to illustrate relationships between many different entities in a concise space.

Other Aspects of the Invention

As has been illustrated and explained in detail, the system of the invention can use a hierarchical form or style of presentation in a graphical user interface to depict and display non-hierarchical relationships. A user can select the relationships of interest to that user. The system also allows a single entity represented by an icon to be displayed in multiple places on the same display without confusing the user because the relationships of each instance of a displayed icon are clearly expressed through the icon hierarchy provided by the invention. Also, certain relationship functions can be used to condense the view of a large number of objects. This provides a more concise view for the user and allows more relationship information to be displayed in a smaller display area as compared to conventional graphical user interfaces. While the general operation and details of the invention have been provided at this point, there are various aspect and advantages of the system of the invention worth visiting in a bit more detail.

It is important to understand that multiple relationships can be overlaid with one another on the same portion of a hierarchy section using the GRUI (e.g., 200) provided by the invention. An example of this aspect of the invention is shown in FIG. 2 within sub-lists 213 through 215, which conveys to the user the first relationship of the different operating system types to each volume, as well as the second relationship between each volume to each storage system that maintains that volume.

Another important point is that the invention is based, in part, on the observation and realization by the inventors that a hierarchy need not be a static depiction of one relationship between two entities, but rather, a hierarchical style display can be used and dynamically manipulated by the user to show multiple relationships and those of particular interest to the user. Since a user is able to select the relationships of interest to a particular set of objects or entities, and have multiple relationships conveyed and displayed in a single hierarchical style format on the display 110-3, more information can be conveyed in a smaller amount of space. Also, the system of the invention allows a user to develop insights that were never before discovered which can now, using the invention, be ready identified and apparent based on the multi-relationship-display capability of the GRUI of this invention. For example, since the user is able to selectively chose what relationships are to be used in order to produce the display, relationships that are not of interest do not clutter the display hierarchy format.

Furthermore, it is to be understood that preferred embodiments of the invention update all areas of the GRUI 200 based on user operations to reflect the status of relationships affected by a user's selection of a relationship function. That is, if a user invokes a relationship function (via selecting a relationship selection) on an object or arrangement descriptor, other instances of icons that represent that descriptor will also be adjusted when the GRUI 200 is redisplayed to reflect the relationship changes. Other icons, besides those that represent the actual icon selected by the user (e.g., other arrangement or object icons), may also be automatically changed, updated, removed, altered, or otherwise modified in appearance based on the user relationship selection.

For instance, in FIG. 5, suppose a user decides to remove vol2@Symm08 from the sub-list 213 under the MVS arrangement icon 210-7. This may be done via the relationship selection menu as explained above, or the user may depress a delete key or perform some other input action to invoke the appropriate relationship function to affect removal of this icon (the "vol02@Symm08" icon in sub-list 213 in FIG. 5). In response, the relationship engine 553 re-computes the content of the GRUI 200 (e.g., re-computes what descriptors are to be displayed in the descriptor tree 555 in FIG. 9). Since the sub-list 340 under the "MVS" arrangement icon 210-10 also contains an object icon for "vol02", the system of the invention would remove this "vol02"object icon from the sub-list 340 in the GRUI 200 as well, even though the user did not select this icon. This is because the object icon "vol02"in sub-list 340 corresponds to the same object descriptor in memory as the user selected icon vol02@Symm08in sub-list 213.

Likewise, the MVS arrangement icon 210-10 would no longer have any related child icons and thus the system of the invention would remove the MVS arrangement icon 210-10 from the GRUI 200 as well. In other words, the relationship that the GRUI 200 visually conveys to the user in FIG. 5, that being that "vol2" is an MVS volume (arrangement icon 210-10) that resides on the Symmetrix 08 storage system (represented by object icon 205-3), no longer applies since the user removed the vol02@Symm08icon from sub-list 213. Its removal causes the relationship engine 553 to adjust the content of the arrangement descriptor 410 (FIG. 10) corresponding to the MVS group arrangement icon 210-7 by removing "vol02" from the "DESCRIPTOR CHILDREN" field 663 (FIG. 10). When the content of the arrangement descriptor 410 (FIG. 10) changes, effectively, the relationships between descriptors change. As such, the relationship engine 553 recalculates the contents of the GRUI 200 represented by the descriptor tree 555 to reflect the changed relationships. The system then re-draws the GRUI 200 to not include the MVS arrangement icon 210-1 or it's sub-list 340 and to not include the vol02@Symm08 icon in sub-list 213. This example thus illustrates how the relationship engine 553 can update icons that correspond to the icon selected by-the user in other parts of the GRUI 200, as well as other icons and portions of the GRUI 200 that do not directly correspond to the icon selected by a user.

Moreover, as will be explained in more detail, the relationships themselves which, in the former examples are defined by relationship functions, can be specified elsewhere. For example, they may be inherent in the attributes or properties of object or arrangement descriptors stored in the memory 110-5, or they may be stored as separate functions in a database, a file or in another configuration independently of the hierarchy data.

Still further, the GRUI (e.g., 200) provided by the system of this invention can invoke (or not) actual changes in the configuration of entities represented in-the GRUI. As example with respect to FIG. 3, when a user selects; the "Volumes" arrangement icon 210-4 and "pulls-down" the selection menu 300, the GRUI 200 provides a "Delete from Symm 08. . . "option 305 that the user may choose to select. According to this invention, if the user selects this delete option 305 from the menu, two results can be obtained, each depending on the embodiment of the invention. In one embodiment, the result would be to only remove the selected arrangement icon 210-4 from the view on the GRUI 200. This would clear up the view of the GRUI 200 for a user, which may clarify his or her understanding of the relationships on display within the GRUI 200. This action however might not have any effect on the actual volumes. In other words, the delete selection 305 can be provided in one embodiment to simply remove the selected portion of the hierarchy from the visible GRUI 200 display without altering any actual volume configuration information in any volumes.

Alternatively, in another embodiment, if a user selects the delete option 305, the intent of the user might be to actually change the configuration of the Symm08storage system so that the selected volumes indicated by arrangement icon 210-4 are actually to be deleted from the storage system. Whether this change can possibly be implemented by the computing system 10 (i.e., whether the volumes could actually be physically deleted) is a detail not of concern to this invention. Rather, the point is that the method using the GRUI 200 of the invention can include conventional graphical user interface editing operations such as moving folders, copying files, deleting entities, and so forth. One advantage that this invention provides however over conventional graphical user interfaces is that the relationships depicted in the GRUI of the invention can indicate information not formerly available in conventional graphical user interfaces, which can thus aide a user in his or her decision to take a specific action (e.g., to delete a volume).

As a specific example of the benefits of this aspect of the invention, as shown in FIG. 2, the GRUI 200 of this invention clearly illustrates in one concise area of the display 110-3 the fact that volumes "vol05" on storage system "Symm 07" and "vol05" on storage system "Symm 08" each contain some Windows NT operating system information (e.g., perhaps they are configured with Windows NT file systems). This multi-relationship display result, when viewed by a user, might cause the user, by way of example only, to delete these volumes in effort to clean up any Windows NT data from those storage systems. Perhaps this might be done in response to the user (systems manager) removing all Windows NT computing systems (e.g., computing system 130 in FIG. 1) from the network environment, in which case those volumes might no longer be needed and thus this disk space can be released for other purposes.

The GRUI provided by the system of the invention also supports recursive hierarchies. A recursive hierarchy may be, for instance, one in which an icon can be displayed multiple times within a single hierarchical tree, usually at different levels in the tree, but under a common parent icon in the tree. As noted in the summary of the invention section above, the tern "recursive" hierarchy as used herein generally implies the ability of the GRUI of this invention to display an icon in multiple places on the GRUI. The GRUI may thus display an icon a parent icon and then again as a child icon at some point beneath the parent icon representing the same descriptor, or, the same icon may be displayed in multiple places on the GRUI that are not necessarily related to one another in a hierarchical manner. In this instance, the ability of the invention to display icons "recursively" actually represents more of a display of an arbitrary relationship between the icons, or a many-to-many relationship.

While not specifically shown in the figures, an example of a recursive hierarchy of which a GRUI of the invention can display can be easily explained with reference to the connection relationships between the computing systems 110 through 140 shown in FIG. 1. As previously noted, the example interconnections between computing systems 110 through 140 in FIG. 1 are non-hierarchical peer-to-peer connections. They can however be modeled by a GRUI of the invention to appear as follows:

"Entire Network"
  "A"
  "B"
  "C"
  "D"

where "Entire Network" is an arrangement icon and "A" through "D" are object icons representing object descriptors in memory 110-5 for each computing systems 110 through 140. Using the techniques discussed herein, the invention can provide a hierarchical style GRUI to display connection relationships between the computing systems to a user, for example as follows:

"Entire Network"
  "A"
    "Connected Computers"
      "B"
      "C"

```
           "Entire Network"
              "B"
                         "Connected Computers"
                              "A"
              "C"
                         "Connected Computers"
                              "A"
                              "D"
              "D"
                         "Connected Computers"
                              "C"
                              "Connected Computers"
                                   "A"
                                   "A"
``` where "Connected Computers" is also an arrangement icon. This arrangement can be implemented using the techniques and mechanisms discussed above. Also as explained previously, the above example shows how an icon can be a text label only, with no accompanying graphic. Such a text-only representation of icons can be useful, for example, in character based displays that might use command line interfaces to allow users to input relationship selections.

This particular example shows how the hierarchical form of a display, as can be provided by embodiments of this invention, has a use even when relationships are purely non-hierarchical in nature. Also illustrated above is the fact that the system of the invention allows a given item (e.g. "A") to appear in more than one place in the display at one time. This is the recursive feature of the graphical user interface of the invention. As noted above, what is meant by "recursive" is that an icon can be shown in more than one location, and the duplicate location need not be actually recursive to an ancestor icon (though it may, as will be explained), but could, as shown here, be displayed to illustrate many-to-many relationships or any other arbitrary relationship(s). Another example of the invention's ability to display a recursive hierarchy is shown in the expansion (in the above example) of the "C" computer under the already expanded "D" computer. This expansion of the "C" computer under the "D" computer again shows that computers "A" and "D" are connected to "C." Since this expansion is being done "under" "D," the "D" computer shown under the upper-most (i.e., the first expanded) "D" computer is duplicative.

This invention allows such relationships to be displayed. Users are not typically confused by this recursion or re-occurrence of items in multiple places in the graphical user interface of this invention because the parent child relationships make clear which multiple relationships that are displayed at one time.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In a computer system having a memory system and a display that displays a graphical user interface, a method for presenting relationships between icons to a user of the computer system, the method comprising the steps of:

displaying a plurality of icons in the graphical user interface on the display;

receiving a user selection of an icon from the plurality of icons;

receiving a relationship selection selected by the user that corresponds to the icon selected by the user;

performing a relationship function identified by the relationship selection selected by the user, the relationship function being performed upon a descriptor in the memory system that is related, according to the relationship selection, to the icon selected by the user, the relationship function producing a display result that includes an arrangement icon that represents a newly displayed relationship to the icon selected by the user; and displaying a representation of the display result in the graphical user interface on the display, the display result operable to display multiple representations of an object via respective object icons in different locations representing the object, each representation corresponding to a respective relationship indicative of the object at that location.

2. The method of claim 1 wherein the step of displaying a plurality of icons displays a hierarchical configuration of object icons and arrangement icons on the graphical user interface, each object icon representing a respective object descriptor within the memory system and each arrangement icon representing a respective arrangement descriptor within the memory system and each arrangement descriptor representing at least one relationship between certain of the object descriptors within the memory system.

3. The method of claim 2 wherein each object descriptor and each arrangement descriptor is maintained in a descriptor tree, and wherein arrangement descriptors defined in a first level of the tree serve as group arrangement descriptors.

4. The method of claim 1 wherein the step of receiving a relationship selection selected by the user includes the steps of:

dynamically determining a set of relationships that are applicable to the icon selected by the user;

displaying the set of relationships on the graphical user interface in a relationship selection menu; and allowing the user to select the relationship selection from the set of relationships displayed on the graphical user interface.

5. The method of claim 4 wherein the step of dynamically determining a set of relationships that are applicable to the icon selected by the user includes the steps of:

determining an identity of a descriptor in the memory system that corresponds to the icon selected by the user;

determining a list of selected icon child descriptors related to the descriptor in the memory system that corresponds to the icon selected by the user;

for each selected icon child descriptor in the list of selected icon child descriptors, determining a list of group arrangement descriptors in the memory system that include a relation to that selected icon child descriptor; and creating a relationship selection in the set of relationships for each unique group arrangement descriptor existing in the list of group arrangement descriptors for each selected icon child descriptor.

6. The method of claim 5 wherein the step of performing a relationship function includes the steps of:

determining a group arrangement descriptor in the memory system that corresponds to the relationship selection selected by the user;

determining a list of group child descriptors related to the group arrangement descriptor in the memory system that corresponds to the relationship selection selected by the user;

creating a sub-list of child descriptors that depends hierarchically from the descriptor in the memory system that corresponds to the icon selected by the user, the sub-list of child descriptors including a reference to each group child descriptor in the list of group child descriptors; and producing a display result that includes icons corresponding to each child descriptor in the sub-list of child descriptors.

7. The method of claim 6 wherein the step of creating a sub-list of child descriptors includes the step of:

for each selected icon child descriptor in the list of selected icon child descriptors, determining which group child descriptor in the list of group child descriptors contains a relation to that icon child descriptor and adding that group child descriptor to the sub-list of child descriptors.

8. The method of claim 5 wherein the step of determining a list of group arrangement descriptors in the memory system that include a relation to that selected icon child descriptor determines a list of group arrangement descriptors in the memory system that include a relation to that selected icon child descriptor other than an arrangement descriptor corresponding to the icon selected by the user.

9. The method of claim 1 wherein the step of receiving a relationship selection selected by the user includes the steps of:

determining an identity of a descriptor in the memory system that corresponds to the icon selected by the user;

determining a set of relationships identified within the descriptor that corresponds to the icon selected by the user;

displaying the set of relationships on the graphical user interface; and allowing the user to select the relationship selection from the set of relationships displayed on the graphical user interface.

10. The method of claim 9, wherein the step of determining a set of relationships identified within the descriptor that corresponds to the icon selected by the user includes the steps of:

identifying object properties of the descriptor in the memory system that correspond to the icon selected by the user; and creating a relationship selection in the set of relationships for each unique object property identified in the descriptor in the memory system that corresponds to icon selected by the user.

11. The method of claim 9 wherein the step of performing a relationship function includes the steps of:

determining a list of selected icon child descriptors related to the descriptor in the memory system that corresponds to the icon selected by the user;

sorting the list of selected icon child descriptors based on at least one property of each selected icon child descriptor, the at least one property corresponding to the relationship selection selected by the user;

based on the step of sorting, producing a sub-list of child descriptors that depend hierarchically from the descriptor in the memory system that corresponds to icon selected by the user, the sub-list of child descriptors including at least one arrangement descriptor corresponding to the at least one property corresponding to the relationship selection selected by the user; and producing a display result that includes icons for each child descriptor in the sub-list of child descriptors.

12. The method of claim 1 wherein the step of performing a relationship function includes the steps of:

determining a list of selected icon child descriptors related to a descriptor in the memory system that corresponds to the icon selected by the user;

sorting the list of selected icon child descriptors based on at least one property of each selected icon child descriptor, the at least one property corresponding to the relationship selection selected by the user; and based on the step of sorting, producing a sub-list of child descriptors that depend hierarchically from the descriptor in the memory system that corresponds to the at least one icon selected by the user, the sub-list of child descriptors including at least one arrangement descriptor corresponding to the at least one property corresponding to the relationship selection selected by the user; and producing a display result that includes icons for each child descriptor in the sub-list of child descriptors.

13. The method of claim 12 wherein:

the relationship selected by the user indicates that the user desires to sort by name a list of selected icon child descriptors that relate to a descriptor in the memory system that corresponds to the icon selected by the user;

and wherein the step of sorting condenses the list of selected icon child descriptors into the sub-list of child descriptors based on a name of each selected icon child descriptor and based on a total number of selected icon child descriptors, the sub-list of child descriptors having less descriptors than the list of selected icon child descriptors; and wherein the sub-list of child descriptors includes at least one child descriptor that is an arrangement descriptor that represents more than one selected icon child descriptor and that may be expanded to produce a display result that shows each selected icon child descriptor which that arrangement descriptor represents.

14. The method of claim 1 wherein the step of performing a relationship function includes the steps of:

determining a group arrangement descriptor in the memory system to corresponds to the relationship selection selected by the user;

determining a list of group child descriptors related to the group arrangement descriptor in the memory system that corresponds to the relationship selection selected by the user;

creating a sub-list of child descriptors that depends hierarchically from a descriptor in the memory system that corresponds to the icon selected by the user, the sub-list of child descriptors including a reference to each group child descriptor in the list of group child descriptors; and producing a display result that includes icons for each child descriptor in the sub-list of child descriptors.

15. The method of claim 14 wherein the step of creating a sub-list of child descriptors includes the steps of:

determining a list of selected icon child descriptors related to the descriptor in the memory system that corresponds to the icon selected by the user; and for each selected icon child descriptor in the list of selected icon child descriptors, determining which group child descriptor in the list of group child descriptors contains a relation to that icon child descriptor and adding that group child descriptor to the sub-list of child descriptors.

16. The method of claim 1 further including the steps of:

receiving a user selection of an icon to expand within the plurality of icons displayed on the graphical user interface;

determining an identity of a descriptor in the memory system that corresponds to the icon selected to expand;

determining a sub-list of selected icon child descriptors related to the descriptor in the memory system that corresponds to the icon selected by the user; and producing a display result that includes icons for each selected icon child descriptor in the sub-list of selected icon child descriptors.

17. The method of claim 1 wherein:

the relationship selection selected by the user specifies a grouping by which to arrange the icons related to the icon selected by the user; and wherein the relationship function produces a display result containing icons arranged according to the specified grouping.

18. The method of claim 17 wherein the display result includes a sub-list of at least one icon, the sub-list of at least one icon including an icon for each value of the specified grouping to which a child descriptor of a descriptor related to the icon selected by the user belongs.

19. The method of claim 17 wherein the graphical user interface is provided by a storage system management application and wherein certain icons displayed on the graphical user interface represent entities related to a storage system and certain other icons identify relationships between certain entities related to a storage system.

20. The method of claim 19 wherein certain icons within the graphical user interface identify relationships between operating system types and locations of entities related to a storage system.

21. The method of claim 1 wherein:

the relationship selection selected by the user indicates that the user desires to sort by name a list of selected icon child descriptors that relate to a descriptor in the memory system that corresponds to the icon selected by the user;

and wherein the step of performing the relationship function condenses the list of selected icon child descriptors into a sub-list of child descriptors based on a name of each selected icon child descriptor and based on a total number of selected icon child descriptors, the sub-list of child descriptors having less descriptors than the list of selected icon child descriptors; and wherein the relationship function produces a display result that includes icons corresponding to descriptors in the sub-list of child descriptors, the sub-list including at least one child descriptor that is an arrangement descriptor that represents more than one selected icon child descriptor and that may be expanded to produce a display result that shows each selected icon child descriptor which that arrangement descriptor represents.

22. The method of claim 1 wherein the relationship selection selected by the user specifies a condense relationship function to display a condensed view of a sub-list of icons that depend from the icon selected by the user; and wherein step of performing a relationship function performs the steps of:

determining that a number of icons to be displayed below the icon selected by the user exceeds a predetermined number;

condensing the number of icons to be displayed into a list of series arrangement icons; and providing the condensed list of series arrangement icons in the display result.

23. The method of claim 22 wherein the step of condensing includes the steps of:

computing the square root of a total number of icons to be displayed;

providing, in the display result, a number of series arrangement icons equal in number to a truncated value of the square root of the total number of icons to be displayed; and determining if the truncated value of the square root multiplied by the truncated value of the square root is less than the total number of icons to be displayed, and if so, providing one extra series arrangement icon to be displayed in the display result.

24. The method of claim 1 wherein the display result is further operable to display multiple instantiated representations of an object via the object icon representing the object wherein the selected relationship is applicable to each instantiation.

25. The method of claim 1 wherein each of the relationships are independent of other relationships triggering simultaneous object icon displays on the display result.

26. A method for simultaneously displaying multiple relationships between entities managed by a software application, the method comprising the steps of:

maintaining, in a memory system, a plurality of object descriptors, each object descriptor representing an entity managed by the software application;

displaying, in a graphical user interface on a display, at least two arrangement icons that each include an independent relationship to a common object descriptor, the display operable to display multiple representations of an object via the respective object icons in different locations representing the object, each representation corresponding to the respective independent relationship indicative of the object in different locations; and displaying, on the graphical user interface, an object icon representing the common object descriptor, the object icon displayed in relation to the at least two arrangement icons that include the relationship to the common object descriptor in order to convey to a user of the graphical user interface that the at least two relationships represented by the arrangement icons relate to the object icon.

27. The method of claim 26 wherein:

the step of displaying, on a graphical user interface, the at least two arrangement icons displays the at least two arrangement icons hierarchically under the object icon representing the common object descriptor;

wherein the method further includes the steps of:

receiving a relationship selection selected by the user that corresponds to one of the at least two arrangement icons; and in response to the step of receiving a user selection of a relationship, expanding the one of the at least two arrangement icons to produce a sub-list of icons that are related to the common object icon based upon the relationship selected by the user.

28. The method of claim 26 further including the step of displaying in more than one location in the graphical user interface, an icon representing a descriptor, such that the graphical user interface represents a recursive hierarchy.

29. A computer system, comprising:
- a display;
- a memory system;
- a processor; and
- a bus connecting the display, the processor and the memory system;
- wherein the memory system is encoded with an application that when performed on the processor, causes the processor to provide a graphical user interface on the display of the computer system, the graphical user interface displaying a plurality of icons on the display to a user of the computer system and receiving, via a user input device coupled to the bus, a user selection of an icon from the plurality of icons and further receiving, via the user input device, a relationship selection selected by the user that corresponds to the icon selected by the user;
- wherein when the application is further performed on the processor, the application causes the processor to perform a relationship function identified by the relationship selection selected by the user, the relationship function operating upon a descriptor in the memory system that is related, according to the relationship selection, to the icon selected by the user, the relationship function producing a display result that includes an arrangement icon that represents a newly displayed relationship to the icon selected by the user; and
- the processor displaying a representation of the display result in the graphical user interface on the display, the display result operable to display multiple representations of a relationship via the respective icons in different locations satisfying the relationship, each representation corresponding to an independent relationship indicative of the relationships corresponding to the selected icon at that location.

30. The computer system of claim 29 wherein when the processor performs the operation of receiving a relationship selection selected by the user, the processor performs the operations of:
- dynamically determining a set of relationships that are applicable to the icon selected by the user;
- displaying, on the display, the set of relationships on the graphical user interface in a relationship selection menu; and
- allowing the user to select, via the user input device, the relationship selection from the set of relationships displayed on the graphical user interface.

31. The computer system of claim 30 wherein when the processor performs the operation of dynamically determining a set of relationships that are applicable to the icon selected by the user, the processor performs the operations of:
- determining an identity of a descriptor in the memory system that corresponds to the icon selected by the user;
- determining a list of selected icon child descriptors related to the descriptor in the memory system that corresponds to the icon selected by the user;
- for each selected icon child descriptor in the list of selected icon child descriptors, determining a list of group arrangement descriptors in the memory system that include a relation to that selected icon child descriptor; and
- creating a relationship selection in the set of relationships for each unique group arrangement descriptor existing in the list of group arrangement descriptors for each selected icon child descriptor.

32. The computer system of claim 31 wherein when the processor performs the operation of performing a relationship function, the processor performs the operations of:
- determining a group arrangement descriptor in the memory system that corresponds to the relationship selection selected by the user;
- determining a list of group child descriptors related to the group arrangement descriptor in the memory system to corresponds to the relationship selection selected by the user;
- creating a sub-list of child descriptors that depends hierarchically from the descriptor in the memory system that corresponds to the icon selected by the user, the sub-list of child descriptors including a reference to each group child descriptor in the list of group child descriptors; and
- producing a display result that includes icons corresponding to each child descriptor in the sub-list of child descriptors.

33. The computer system of claim 29 wherein when the processor performs the operation of performing a relationship function, the processor performs the operations of:
- determining a list of selected icon child descriptors related to a descriptor in the memory system that corresponds to the icon selected by the user;
- sorting the list of selected icon child descriptors based on at least one property of each selected icon child descriptor, the at least one property corresponding to the relationship selection selected by the user; and
- based on the step of sorting, producing a sub-list of child descriptors that depend hierarchically from the descriptor in the memory system that corresponds to the at least one icon selected by the user, the sub-list of child descriptors including at least one arrangement descriptor corresponding to the at least one property corresponding to the relationship selection selected by the user; and
- producing a display result that includes icons for each child descriptor in the sub-list of child descriptors.

34. The computer system of claim 29 wherein when the processor performs the operation of performing a relationship function, the processor performs the operations of:
- determining a group arrangement descriptor in the memory system to corresponds to the relationship selection selected by the user;
- determining a list of group child descriptors related to the group arrangement descriptor in the memory system to corresponds to the relationship selection selected by the user;
- creating a sub-list of child descriptors that depends hierarchically from a descriptor in the memory system that corresponds to the icon selected by the user, the sub-list of child descriptors including a reference to each group, child descriptor in the list of group child descriptors; and
- producing a display result that includes icons for each child descriptor in the sub-list of child descriptors.

35. The computer system of claim 29 wherein the processor further performs the operations of:
- receiving a user selection of an icon to expand within the plurality of icons displayed on the graphical user interface;

determining an identity of a descriptor in the memory system that corresponds to the icon selected to expand;

determining a sub-list of selected icon child descriptors related to the descriptor in the memory system that corresponds to the icon selected by the user; and producing a display result that includes icons for each selected icon child descriptor in the sub-list of selected icon child descriptors.

36. The computer system of claim 29 wherein:

the relationship selection selected by the user indicates that the user desires to sort by name a list of selected icon child descriptors that relate to a descriptor in the memory system that corresponds to the icon selected by the user;

and wherein when-the processor performs the operation of performing the relationship function, the relationship function condenses the list of selected icon child descriptors into a sub-list of child descriptors in the memory system based on a name of each selected icon child descriptor and based on a total number of selected icon child descriptors, the sub-list of child descriptors having less descriptors than the list of selected icon child descriptors; and wherein the relationship function, when processed by the processor, produces a display result that includes icons corresponding to descriptors in the sub-list of child descriptors, the sub-list including at least one child descriptor that is an arrangement descriptor that represents more than one selected icon child descriptor and that may be expanded to produce a display result that shows each selected icon child descriptor which that arrangement descriptor represents.

37. A computer program product having a computer-readable medium including computer program logic encoded thereon that when executed on a computer system having a coupling of a memory system, a processor, and a display that displays a graphical user interface, wherein the computer program logic provides a method for presenting relationships between icons to a user of the computer system, and wherein when the computer program logic is executed on the processor, the computer program logic causes the processor to perform the operations of:

displaying a plurality of icons on the graphical user interface;

receiving a user selection of an icon from the plurality of icons;

receiving a relationship selection selected by the user that corresponds to the icon selected by the user;

performing a relationship function identified by the relationship selection selected by the user, the relationship function being performed upon a descriptor in the memory system that is related, according to the relationship selection, to the icon selected by the user, the relationship function producing a display result that includes an arrangement icon that represents a newly displayed relationship to the icon selected by the user; and displaying a representation of the display result in the graphical user interface on the display, the display result operable to display multiple representations of an object via the respective arrangement icons in different locations representing the relationship, each representation independently corresponding to a respective relationship indicative of the respective icon selected by the user.

38. The computer program product of claim 37 wherein when the computer program logic causes the processor to perform the operation of receiving a relationship selection selected by the user, the computer program logic causes the processor to perform the operations of:

dynamically determining a set of relationships that are applicable to the icon selected by the user;

displaying, on the display, the set of relationships on the graphical user interface in a relationship selection menu; and allowing the user to select, via the user input device, the relationship selection from the set of relationships displayed on the graphical user interface.

39. The computer program product of claim 37 wherein when the computer program logic causes the processor to perform the operation of dynamically determining a set of relationships that are applicable to the icon selected by the user, the computer program logic causes the processor to perform the operations of:

determining an identity of a descriptor in the memory system that corresponds to the icon selected by the user;

determining a list of selected icon child descriptors related to the descriptor in the memory system that corresponds to the icon selected by the user;

for each selected icon child descriptor in the list of selected icon child descriptors, determining a list of group arrangement descriptors in the memory system that include a relation to that selected icon child descriptor; and creating a relationship selection in the set of relationships for each unique group arrangement descriptor existing in the list of group arrangement descriptors for each selected icon child descriptor.

40. The computer program product of claim 39 wherein when the computer program logic causes the processor to perform the operation of performing a relationship function, the computer program logic causes the processor to perform the operations of:

determining a group arrangement descriptor in the memory system that corresponds to the relationship selection selected by the user;

determining a list of group child descriptors related to the group arrangement descriptor in the memory system to corresponds to the relationship selection selected by the user;

creating a sub-list of child descriptors that depends hierarchically from the descriptor in the memory system that corresponds to the icon selected by the user, the sub-list of child descriptors including a reference to each group child descriptor in the list of group child descriptors; and producing a display result that includes icons corresponding to each child descriptor in the sub-list of child descriptors.

41. The computer program product of claim 37 wherein when the computer program logic causes the processor to perform the operation of performing a relationship function, the computer program logic causes the processor to perform the operations of:

determining a list of selected icon child descriptors related to a descriptor in the memory system that corresponds to the icon selected by the user;

sorting the list of selected icon child descriptors based on at least one property of each selected icon child descriptor, the at least one property corresponding to the relationship selection selected by the user; and based on the step of sorting, producing a sub-list of child descriptors that depend hierarchically from the descriptor in the memory system that corresponds to the at least one icon selected by the user, the sub-list of child descriptors including at least one arrangement descriptor corresponding to the at least one property corresponding to the relationship selection selected by the user; and producing a display result that includes icons for each child descriptor in the sub-list of child descriptors.

42. The computer program product of claim 37 wherein when the computer program logic causes the processor to perform the operation of performing a relationship function, the computer program logic causes the processor to perform the operations of:

determining a group arrangement descriptor in the memory system to correspond to the relationship selection selected by the user;

determining a list of group child descriptors related to the group arrangement descriptor in the memory system to corresponds to the relationship selection selected by the user;

creating a sub-list of child descriptors that depends hierarchically from a descriptor in the memory system that corresponds to the icon selected by the user, the sub-list of child descriptors including a reference to each group child descriptor in the list of group child descriptors; and producing a display result that, includes icons for each child descriptor in the sub-list of child descriptors.

43. The computer program product of claim 37 wherein the computer program logic further causes the processor to perform the operations of:

receiving a user selection of an icon to expand within the plurality of icons displayed on the graphical user interface;

determining an identity of a descriptor in the memory system that corresponds to the icon selected to expand;

determining a sub-list of selected icon child descriptors related to the descriptor in the memory system that corresponds to the icon selected by the user; and producing a display result that includes icons for each selected icon child descriptor in the sub-list of selected icon child descriptors.

44. The computer program product of claim 37 wherein when the computer program logic is executed on the processor:

the relationship selection selected by the user indicates that the user desires to sort by name a list of selected icon child descriptors that relate to a descriptor in the memory system that corresponds to the icon selected by the user;

and wherein when the processor performs the operation of performing the relationship function, the relationship function condenses the list of selected icon child descriptors into a sub-list of child descriptors in the memory system based on a name of each selected icon child descriptor and based on a total number of selected icon child descriptors, the sub-list of child descriptors having less descriptors than the list of selected icon child descriptors; and wherein the relationship function, when processed by the processor, produces a display result that includes icons corresponding to descriptors in the sub-list of child descriptors, the sub-list including at least one child descriptor that is an arrangement descriptor that represents more than one selected icon child descriptor and that may be expanded to produce a display result that shows each selected icon child descriptor which that arrangement descriptor represents.

45. In a computer system having a memory system and a display that displays a graphical user interface, a method for presenting relationships between icons to a user of the computer system, the method comprising the steps of:

displaying a plurality of icons in the graphical user interface on the display;

receiving a user selection of an icon from the plurality of icons;

receiving a relationship selection selected by the user that corresponds to the icon selected by the user;

performing a relationship function identified by the relationship selection selected by the user, the relationship function being performed upon a descriptor in the memory system that corresponds to the icon selected by the user, the relationship function producing a display result that includes a modified appearance of an icon that is different than the icon selected by the user but that corresponds to the descriptor in the memory system that corresponds to the icon selected by the user; and displaying a representation of the display result in the graphical user interface on the display, the display result operable to display multiple representations of an object represented by a respective icon, each representation independently corresponding to a respective relationship indicative of the respective icon selected by the user.

46. The method of claim 45 wherein the relationship function identified by the relationship selection selected by the user corresponds to at least one of a move, add, copy, modify and delete relationship function that is performed on the icon selected by the user, and wherein the modified appearance produced in the display result indicates the result of the relationship function upon the icon that is different than the icon selected by the user but that corresponds to the descriptor in the memory system that corresponds to the icon selected by the user.

47. The method of claim 46 wherein the step of performing a relationship function produces a display result that further includes a modified appearance of an icon that is different than the icon selected by the user, and that does not correspond to the descriptor in the memory system that corresponds to the icon selected by the user.

48. In a computer system having a memory system and a display that displays a graphical user interface, a method for presenting relationships between icons to a user of the computer system, the method comprising the steps of:

displaying a plurality of icons in the graphical user interface on the display;

receiving a user selection of an icon from the plurality of icons;

receiving a relationship selection selected by the user that corresponds to the icon selected by the user, the relationship selection being independent of other relationships between other icons;

performing a relationship function identified by the relationship selection selected by the user, the relationship function being performed upon a descriptor in the memory system that is related, according to the relationship selection, to the icon selected by the user, the relationship function producing a display result that includes an arrangement icon that represents a newly displayed relationship to the icon selected by the user;

displaying a representation of the display result in the graphical user interface on the display, the display result operable to display multiple instantiation of an object via the object icon representing the object, each instantiation corresponding to a relationship indicative of the object; and repeating the receiving of the relationship selection, the performing of the relationship function, and the displaying of the display result, the icons being displayed for each object corresponding to the relationship wherein each of the relationships are independent of other relationships triggering simultaneous object icon displays on the display result such that multiple instantiated icons of the same object are displayed wherein the selected relationship is applicable to each instantiation.

* * * * *

UNITED STATES PATENT AND TRADEMARK OFFICE
CERTIFICATE OF CORRECTION

PATENT NO. : 6,636,250 B1
DATED : October 21, 2003
INVENTOR(S) : Morrie Gasser

It is certified that error appears in the above-identified patent and that said Letters Patent is hereby corrected as shown below:

Title page,
Item [73], Assignee, should be listed as: -- EMC Corporation, Hopkinton, MA --

Column 39,
Line 15, "wherein when-the processor" should read -- wherein when the processor --

Signed and Sealed this

Thirtieth Day of March, 2004

JON W. DUDAS
*Acting Director of the United States Patent and Trademark Office*